United States Patent
Yasuda

(10) Patent No.: US 9,020,363 B2
(45) Date of Patent: Apr. 28, 2015

(54) OPTICAL TRANSMITTER

(71) Applicant: Fujitsu Optical Components Limited, Kawasaki-shi (JP)

(72) Inventor: Shuichi Yasuda, Sapporo (JP)

(73) Assignee: Fujitsu Optical Components Limited, Kawasaki (JP)

( * ) Notice: Subject to any disclaimer, the term of this patent is extended or adjusted under 35 U.S.C. 154(b) by 166 days.

(21) Appl. No.: 13/661,606

(22) Filed: Oct. 26, 2012

(65) Prior Publication Data

US 2013/0148981 A1    Jun. 13, 2013

(51) Int. Cl.
  *H04B 10/04*    (2006.01)
  *H04B 10/50*    (2013.01)
  *H04B 10/548*   (2013.01)

(52) U.S. Cl.
  CPC ........ *H04B 10/50575* (2013.01); *H04B 10/548* (2013.01)

(58) Field of Classification Search
  CPC ................................. H04B 10/40–10/50597
  USPC ................................................... 398/182–198
  See application file for complete search history.

(56) References Cited

U.S. PATENT DOCUMENTS

| | | | |
|---|---|---|---|
| 7,817,923 B2* | 10/2010 | Akiyama et al. | 398/188 |
| 2007/0065161 A1 | 3/2007 | Miura et al. | |
| 2007/0177882 A1 | 8/2007 | Akiyama | |
| 2008/0080872 A1 | 4/2008 | Tanaka et al. | |
| 2008/0130083 A1* | 6/2008 | Yasuda | 359/238 |
| 2010/0080571 A1* | 4/2010 | Akiyama et al. | 398/184 |
| 2011/0026935 A1* | 2/2011 | Akiyama et al. | 398/184 |
| 2013/0101296 A1* | 4/2013 | Nishimoto | 398/79 |
| 2013/0155482 A1* | 6/2013 | Toya et al. | 359/279 |

FOREIGN PATENT DOCUMENTS

| | | |
|---|---|---|
| JP | 2007-82094 | 3/2007 |
| JP | 2007-208472 | 8/2007 |
| JP | 2008-92172 | 4/2008 |

\* cited by examiner

*Primary Examiner* — Li Liu
(74) *Attorney, Agent, or Firm* — Staas & Halsey LLP

(57) ABSTRACT

After a startup of an optical transmitter, a control is started in such a way that a modulation amplitude of a driving signal of a phase modulator is set as 0, and that an operational point of a bias voltage is set as the lowest point of light transmission characteristics of the phase modulator. When the operational point of the bias voltage reaches the lowest point, the modulation amplitude of the driving signal is gradually increased from 0 to $2V\pi$.

8 Claims, 22 Drawing Sheets

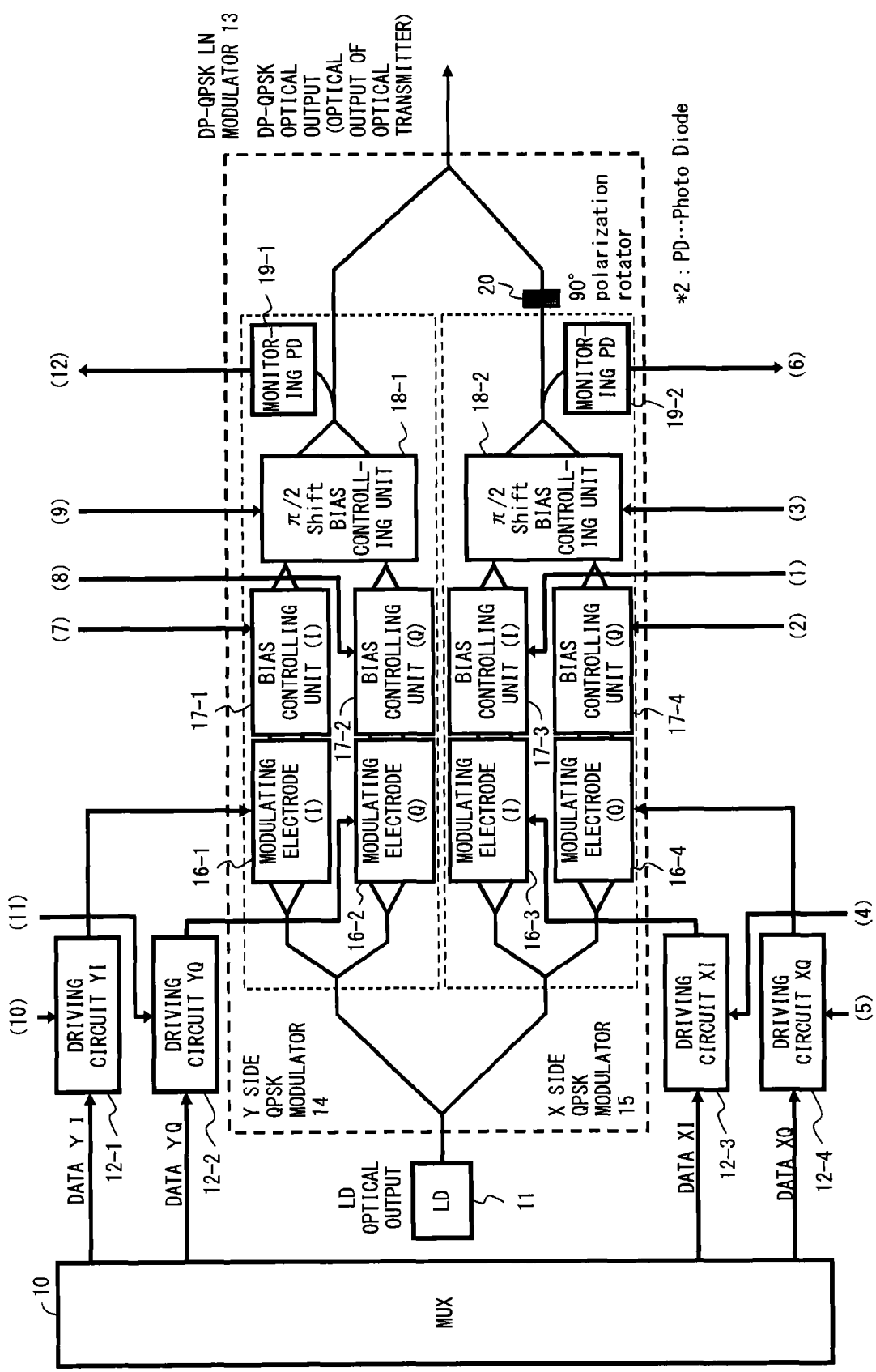
F I G. 3

| SECTION | CONTROL PART | CONTROLLING SIGNAL | CONTROL TIME |
|---|---|---|---|
| I | X SIDE I, Q ARM | (1) (2) | 2sec |
| II | Y SIDE I, Q ARM | (7) (8) | 2sec |
| III | X SIDE I, Q ARM | (1) (2) | 2sec |
| IV | Y SIDE I, Q ARM | (7) (8) | 2sec |
| V | X SIDE $\pi/2$ | (3) | 2sec |
| VI | X SIDE I, Q ARM | (1) (2) | 2sec |
| VII | Y SIDE $\pi/2$ | (9) | 2sec |
| VIII | Y SIDE I, Q ARM | (7) (8) | 2sec |
| IX | X SIDE $\pi/2$ | (3) | 2sec |
| X | X SIDE I, Q ARM | (1) (2) | 2sec |
| XI | Y SIDE $\pi/2$ | (9) | 2sec |
| XII | Y SIDE I, Q ARM | (7) (8) | 2sec |

SIGNAL NAME (1) BIAS (I) OF X SIDE QPSK MODULATOR
(2) BIAS (Q) OF X SIDE QPSK MODULATOR
(3) BIAS OF $\pi/2$ Shift OF X SIDE QPSK MODULATOR
(4) MODULATION AMPLITUDE (I) OF X SIDE QPSK MODULATOR
(5) MODULATION AMPLITUDE (Q) OF X SIDE QPSK MODULATOR
(6) PD MONITOR OF X SIDE QPSK MODULATOR
(7) BIAS (I) OF Y SIDE QPSK MODULATOR
(8) BIAS (Q) OF Y SIDE QPSK MODULATOR
(9) BIAS OF $\pi/2$ Shift OF Y SIDE QPSK MODULATOR
(10) MODULATION AMPLITUDE (I) OF Y SIDE QPSK MODULATOR
(11) MODULATION AMPLITUDE (Q) OF Y SIDE QPSK MODULATOR
(12) PD MONITOR OF Y SIDE QPSK MODULATOR ※ IN BIAS CONTROL IN THE I SIDE AND BIAS CONTROL IN THE Q SIDE, TWO DIFFERENT TYPES OF PILOT FREQUENCIES (F0, F1) ARE SUPERIMPOSED AND DETECTED, RESPECTIVELY, AND THE CONTROLS ARE PERFORMED AT A TIME.

FIG. 15

| SECTION | CONTROL PART | CONTROLLING SIGNAL | CONTROL TIME |
|---|---|---|---|
| I | X SIDE I, Q ARM | (1) (2) ※ | 2sec |
| II | Y SIDE I, Q ARM | (7) (8) ※ | 2sec |
| III | X SIDE I, Q ARM | (1) (2) ※ | 2sec |
| IV | Y SIDE I, Q ARM | (7) (8) ※ | 2sec |
| V | X SIDE π/2 | (3) | 2sec |
| VI | X SIDE I, Q ARM | (1) (2) ※ | 2sec |
| VII | Y SIDE π/2 | (9) | 2sec |
| VIII | Y SIDE I, Q ARM | (7) (8) ※ | 2sec |
| IX | X SIDE π/2 | (3) | 2sec |
| X | X SIDE I, Q ARM | (1) (2) ※ | 2sec |
| XI | Y SIDE π/2 | (9) | 2sec |
| XII | Y SIDE I, Q ARM | (7) (8) ※ | 2sec |

SIGNAL NAME (1) BIAS (I) OF X SIDE QPSK MODULATOR
(2) BIAS (Q) OF X SIDE QPSK MODULATOR
(3) BIAS OF π/2 Shift OF X SIDE QPSK MODULATOR
(4) MODULATION AMPLITUDE (I) OF X SIDE QPSK MODULATOR
(5) MODULATION AMPLITUDE (Q) OF X SIDE QPSK MODULATOR
(6) PD MONITOR OF X SIDE QPSK MODULATOR
(7) BIAS (I) OF Y SIDE QPSK MODULATOR
(8) BIAS (Q) OF Y SIDE QPSK MODULATOR
(9) BIAS OF π/2 Shift OF Y SIDE QPSK MODULATOR
(10) MODULATION AMPLITUDE (I) OF Y SIDE QPSK MODULATOR
(11) MODULATION AMPLITUDE (Q) OF Y SIDE QPSK MODULATOR
(12) PD MONITOR OF Y SIDE QPSK MODULATOR ※ IN BIAS CONTROL IN THE I SIDE AND BIAS CONTROL IN THE Q SIDE, TWO DIFFERENT TYPES OF PILOT FREQUENCIES (F0, F1) ARE SUPERIMPOSED AND DETECTED, RESPECTIVELY, AND THE CONTROLS ARE PERFORMED AT A TIME.

FIG. 20

OPTICAL TRANSMITTER

CROSS-REFERENCE TO RELATED APPLICATION

This application is based upon and claims the benefit of priority of the prior Japanese Patent Application No. 2011-272835, filed on Dec. 13, 2011, the entire contents of which are incorporated herein by reference.

FIELD

The embodiments explained below relate to an optical transmitter.

BACKGROUND

Recently, in a basic DWDM (Dense Wavelength Division Multiplex) optical communication system, a relaying optical amplifier is used on an optical transmission channel. For constraint of transient response characteristics of the optical amplifier, generally, it is a requirement for an optical transmitter which becomes an optical input source to the optical amplifier to have a specification which takes a predetermined time period at a startup and then gradually increase an optical output.

FIG. 1 is one example of the specification at the startup of the optical output required for the optical transmitter. As illustrated in FIG. 1 (1), when a setting signal of an optical source of the optical transmitter changes from OFF to ON, as illustrated in FIG. 1 (2), with the optical output of not less than $P_{min}$, the optical output is slowly started with an inclination within the specification range (0 to 1 mW/sec). Here, in the case of the optical output of not greater than $P_{min}$, since the optical amplifier on the transmission channel does not react, the control is not required. When the optical output becomes greater than $P_{min}$, since the optical amplifier starts to respond, the control is performed so as to gradually increase the optical output.

FIG. 2 explains a content of the control performed when the optical output gradually increases.

Conventionally, the inclination at the startup of the optical output used to be moderated by controlling injected current to a laser diode (LD) of the optical transmitter and by increasing the LD optical output to a prescribed value, for example, linearly, taking a predetermined time period. In addition, when the optical transmitter consists of the LD and a phase modulator, it is a requirement that a bias voltage or an amplitude of an electric signal which drives the phase modulator is controlled to have an optimal value by Auto Bias Control (ABC control). The control is started when an optical input (LD optical output) to the phase modulator reaches $P_{min}$. In the ABC control, the control may be performed by superimposing a pilot frequency which is a low frequency on an optical signal and by detecting the components.

When the phase modulator consists of a plurality of stages, generally, the ABC control of each stage is performed by a time division. Here, explanation is given for the ABC control of a DP-QPSK (Dual Polarization Quadrature Phase Shift Keying) modulation scheme. In performing control by a time division, each time section is divided into I to VI, and the control of the sections I to VI is repeated until the optical output of the LD reaches the prescribed value.

FIG. 3 illustrates a configuration of a DP-QPSK modulator. The modulator of FIG. 3 consists of a MUX 10 which sends out signals to each of driving circuits 12-1 to 12-4, an LD 11 which generates DC light, and a DP-QPSK LN modulator 13.

The DP-QPSK LN modulator 13 consists of an X side QPSK modulator 15 which generates optical signals of a horizontally polarized wave and a Y side QPSK modulator 14 which generates optical signals of a vertically polarized wave.

Driving circuits 12-1 to 12-4 apply driving signals which correspond to data signals to modulating electrodes 16-1 to 16-4 of the X side QPSK modulator 15 and of the Y side QPSK modulator 14, respectively. In the X side QPSK modulator 15 and the Y side QPSK modulator 14, an arm which generates I signals and Q signals is provided, respectively, and as the modulating electrodes 16-1 and 16-2, the electrodes for the I signals are provided, and as the modulating electrodes 16-3 and 16-4, the electrodes for the Q signals are provided, respectively.

Bias controlling units 17-1 to 17-4 are provided in each of the arm for the I signals and the arm for the Q signals of the X side QPSK modulator (phase modulator) 15 and the Y side QPSK modulator (phase modulator) 14. The bias controlling units 17-1 to 17-4 control the bias of a modulating operation in each arm. π/2 Shift bias controlling units 18-1 and 18-2 control the bias so that the optical phase difference of the I signals and the Q signals generated by the X side QPSK modulator 15 and the Y side QPSK modulator 14 become π/2 accurately. Monitoring PDs (Photo Diodes) 19-1 and 19-2 detect light after the modulation of the X side QPSK modulator 15 and the Y side QPSK modulator 14 for each control. A 90° polarization rotator 20 rotates a polarized wave of the optical signal from the X side QPSK modulator 15 by 90° with respect to the optical signal from the Y side QPSK modulator 14 and realizes polarization multiplication.

Hereinafter, explanation is given for the time division ABC control by referring to FIGS. 2 and 3. FIG. 2 illustrates an example in which 12 second-time sections are divided into six and performs the ABC controls which are different in each section.

In section I, bias control is performed using a π/2 Shift bias controlling unit 18-2 of the X side QPSK modulator 15. In section II, the control of the modulation amplitude by the driving circuit 13 for the I signals of the X side QPSK modulator 15 and the bias control of the arm of the I signals of the X side QPSK modulator 15 are performed. In section III, in the arm of the Q signals of the X side QPSK modulator 15, the control of the modulation amplitude by the driving circuit 12-4 and the bias control by the bias controlling unit 17-4 are performed. In section IV, the bias control of the π/2 Shift bias controlling unit 18-1 of the Y side QPSK modulator 14 is performed. In section V, the control of the modulation amplitude by the driving circuit 12-1 of the arm of the I signals of the Y side QPSK modulator 14 and the bias control by the bias controlling unit 17-1 are performed. And in section VI, the control of the modulation amplitude by the driving circuit 12-2 of the arm of the Q signals of the Y side QPSK modulator 14 and the bias control by the bias controlling unit 17-2 are performed. Here, as an example, each section is defined to take 2 seconds.

The monitoring PDs 19-1 and 19-2 detect the optical output of the X side QPSK modulator 15 and the Y side QPSK modulator 14 every time the controls of I to VI are performed.

In controlling sections II, III, V, and VI, the bias control and the amplitude control are performed by superimposing two different types of pilot frequencies on each optical signal and detecting it.

Concerning such time division ABC controls, please see the Patent Documents 2 and 3.

Some in the conventional art perform optimal control of driving signal amplitudes, DC biases, and phase shifters which are related to optical phase modulators such as DQPSK modulators, QPSK modulators, and the like.

Patent Document 1: Japanese Laid-open Patent Publication 2007-208472

Patent Document 2: Japanese Laid-open Patent Publication 2008-092172

Patent Document 3: Japanese Laid-open Patent Publication 2007-082094

In the conventional art, right after the startup of the ABC control (in particular, the control of bias voltages and of amplitudes), a) optical power loss in the phase modulator greatly fluctuates by the large movement of the ABC control toward its convergence point (optimal point). In addition, b) generally, the phase modulator and its driving circuit are implemented nearly because of high frequency characteristics. Accordingly, when the output amplitude of the driving circuit increases, consumption power of the driving circuit increases, and more heat is produced, and because of the heat, a temperature rise of the phase modulator is generated. With this effect, light transmission characteristics (applied voltage vs optical power loss) of the phase modulator is shifted in a short time period, and therefore, the optical power loss in the phase modulator greatly fluctuates in the section where no bias voltage is controlled (the section where the voltage is kept).

FIGS. 4 and 5 explain phenomena in which the optical power loss in the phase modulator greatly fluctuates by a large movement of the ABC control toward its convergence point (optimal point).

FIG. 4 is a graph in which a horizontal axis illustrates an applied voltage of the phase modulator (which is a modulation voltage applied to the modulating electrode of the phase modulator and which is also called a driving voltage) and in which a longitudinal axis illustrates an optical power loss of the phase modulator (optical output of the optical transmitter). The modulation voltage or the driving voltage is controlled by the modulation amplitude in which the voltage for modulation changes, and the bias voltage which is the main voltage of the change).

The optical power loss of the phase modulator (optical output of the optical transmitter) here illustrates the change in the optical output at the time when the applied voltage of the phase modulator changes when the optical output of the LD is the largest. FIG. 4 illustrates the optical power loss characteristics of the phase modulator which has sine curve characteristics, and here, the applied voltage illustrated in the view below the horizontal axis is illustrated. The central point of the amplitude of the applied voltage is called a bias point, and this bias point may sometimes greatly change by the ABC control. In FIG. 4, the bias point is illustrated in black dots, and in the case of the phase modulator, the optimal position of the bias point is the point at which the optical output becomes the smallest.

When the applied voltage moves from (1) to (2), the optical output is illustrated in (3) when the applied voltage is (1), and the optical output is illustrated in (4) when the applied voltage is (2). As seen from comparison of the optical outputs (3) and (4), the power loss of the optical output (optical output) greatly moves.

FIG. 5 is a graph in which a horizontal axis illustrates an applied voltage of the phase modulator and in which a longitudinal axis illustrates an optical power loss of the phase modulator (optical output of the optical transmitter). FIG. 5 illustrates the case where the applied voltage is initially (1), but with the ABC control, the amplitude of the applied voltage suddenly enlarges as illustrated in (2). The optical output is (3) when the applied voltage is (1), and the optical output is (4) when the applied voltage is (2). As seen from comparison of the optical outputs (3) and (4), the optical output greatly fluctuates.

FIG. 6 explains phenomena in which the optical power loss in the phase modulator greatly fluctuates by a shift of light transmission characteristics by a temperature rise.

FIG. 6 is a graph in which a horizontal axis illustrates an applied voltage of the phase modulator and in which a longitudinal axis illustrates the optical power loss of the phase modulator (optical output of the optical transmitter). In FIG. 6, the light transmission characteristics illustrated as a sine curve are shifted to the right by a rapid temperature rise. It is understood that the optical output changes from (1) to (2) although the applied voltage is not changed.

FIG. 7 explains problems shared by the conventional techniques.

As a result of the above mentioned a) and b), such cases occur that the optical output startup inclination of the optical transmitter becomes steep or negative as illustrated in FIG. 7, which means that the optical output cannot be started with the inclination within the specified range.

FIG. 7 is a schematic view and does not strictly illustrate that the inclinations become steep or negative in sections of II, III, V, and VI as illustrated in FIG. 7. By performing the ABC control of sections I to VI, however, such cases may occur that the inclination of the optical output becomes steep or negative in any of these sections.

By the phenomena, a level of the optical input to the optical amplifier which is located as a relaying device on an optical transmission channel of the DWDM optical communication system rapidly changes, or is subject to increase and decrease (ringing). Since a response time of this optical amplifier for the gain control (AGC: Automatic Gain Control) is slow, it cannot follow the rapid change or ringing of the optical input level, and therefore, the optical output level from the optical amplifier transiently changes. This change in the level of the optical output causes deterioration of a transmission quality.

FIG. 8 explains generation of deterioration in the transmission quality in a DWDM optical communication system.

It is presupposed that optical signals with each wavelength are output from the optical transmitters 1 to N, and that a steep change in the optical output or ringing occurs from the optical transmitter 1. The optical signals with each wavelength from the optical transmitters 1 to N is wavelength-multiplexed in the MUX 30 and sent. Wavelength-multiplexed optical signals which were wavelength-multiplexed in the MUX 30 are amplified in a multiplexed state in the optical amplifier 31. Here, by the occurrence of the steep change in the optical output or ringing, the steep change or ringing also occurs over the entire wavelength-multiplexed optical signal as well. Since, however, the response time of the AGC control in the optical amplifier is slow, it cannot follow the steep change or ringing, and the optical output from the optical amplifier 31 indicates some changes which are different from the steep change or ringing. If it could follow the steep change or ringing, the optical signals with the wavelength other than the wavelength at which the ringing occurred would be kept constant, however, in reality, it cannot, and therefore, the change of the optical output occurs in the optical signal with other wavelength as well.

Therefore, when such wavelength-multiplexed optical signals are demultiplexed by a DeMUX 32 and are received by each of the optical receivers 1 to N, change occurs in the optical output with respect to the optical signals with every wavelength. This change in the optical output causes deterioration of the transmission quality in a receiving side.

SUMMARY

The optical transmitter according to one aspect of the embodiments below is an optical transmitter including a phase modulator, wherein the optical transmitter includes: a controlling unit which controls a bias voltage of a driving signal which drives the phase modulator and a modulation amplitude of the driving signal; and a processor which controls the controlling unit to increase the modulation amplitude so that the optical output of the phase modulator becomes a target value by controlling an operational point of the bias voltage so as to decrease the optical output of the light transmission characteristics of the phase modulator after a startup of the optical transmitter.

According to the following embodiments, an optical transmitter capable of preventing the generation of the steep change in the optical output or ringing at the time of startup is provided.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 illustrates a configuration of a DP-QPSK modulator.

FIG. 15 explains a specific configuration example of the present embodiment and its operation (No. 4).

FIG. 20 explains another specific configuration example of the present embodiment (No. 6).

DESCRIPTION OF EMBODIMENTS

Figure 9:
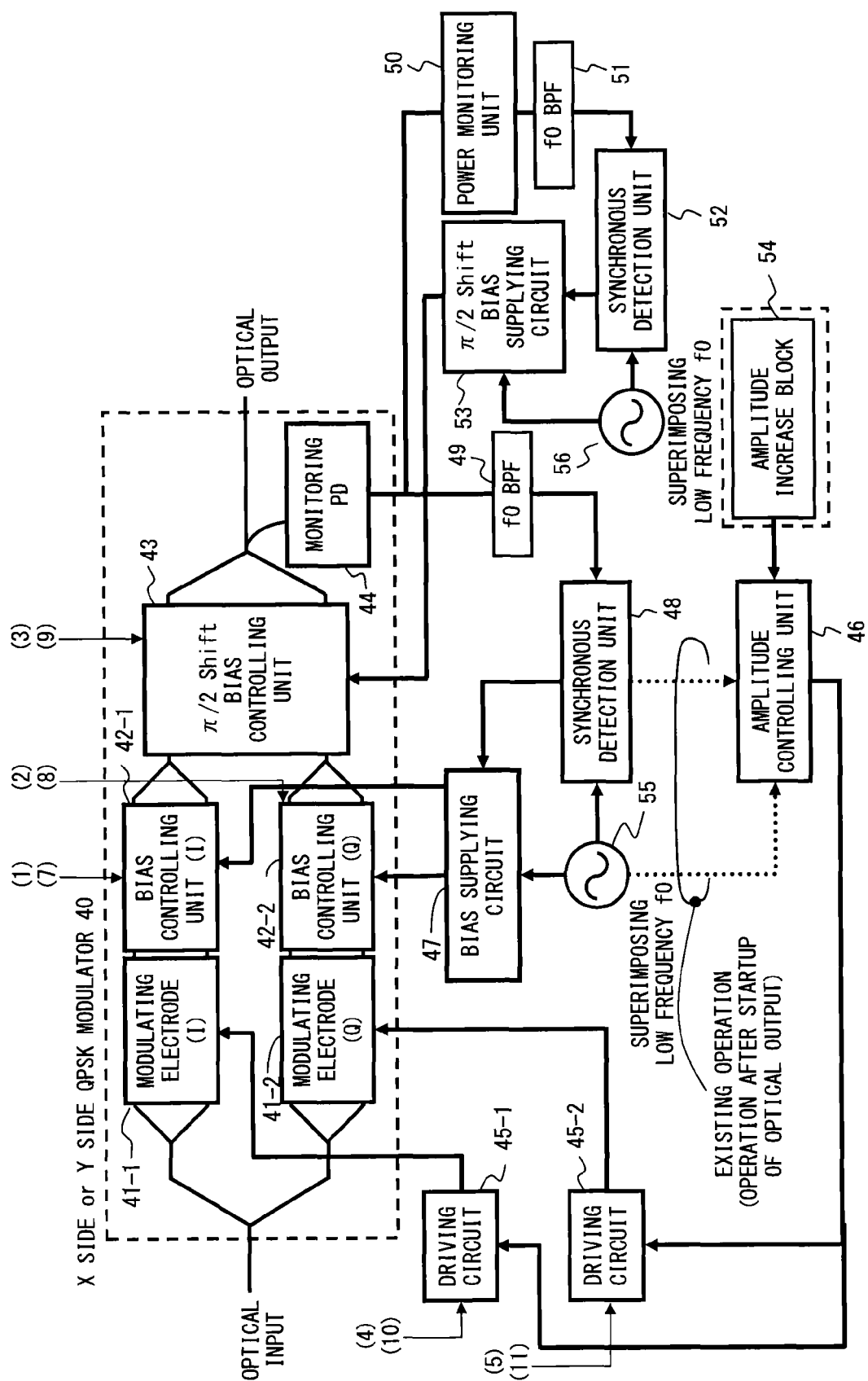
FIG. 9 is a block diagram of a control circuit of the phase modulator of the present embodiment.

FIG. 9 is a block diagram of a control circuit of the phase modulator in the present embodiment. In FIG. 9, signals (1) to (5) and (7) to (11) are the same as those in FIG. 3.

Figure 4:
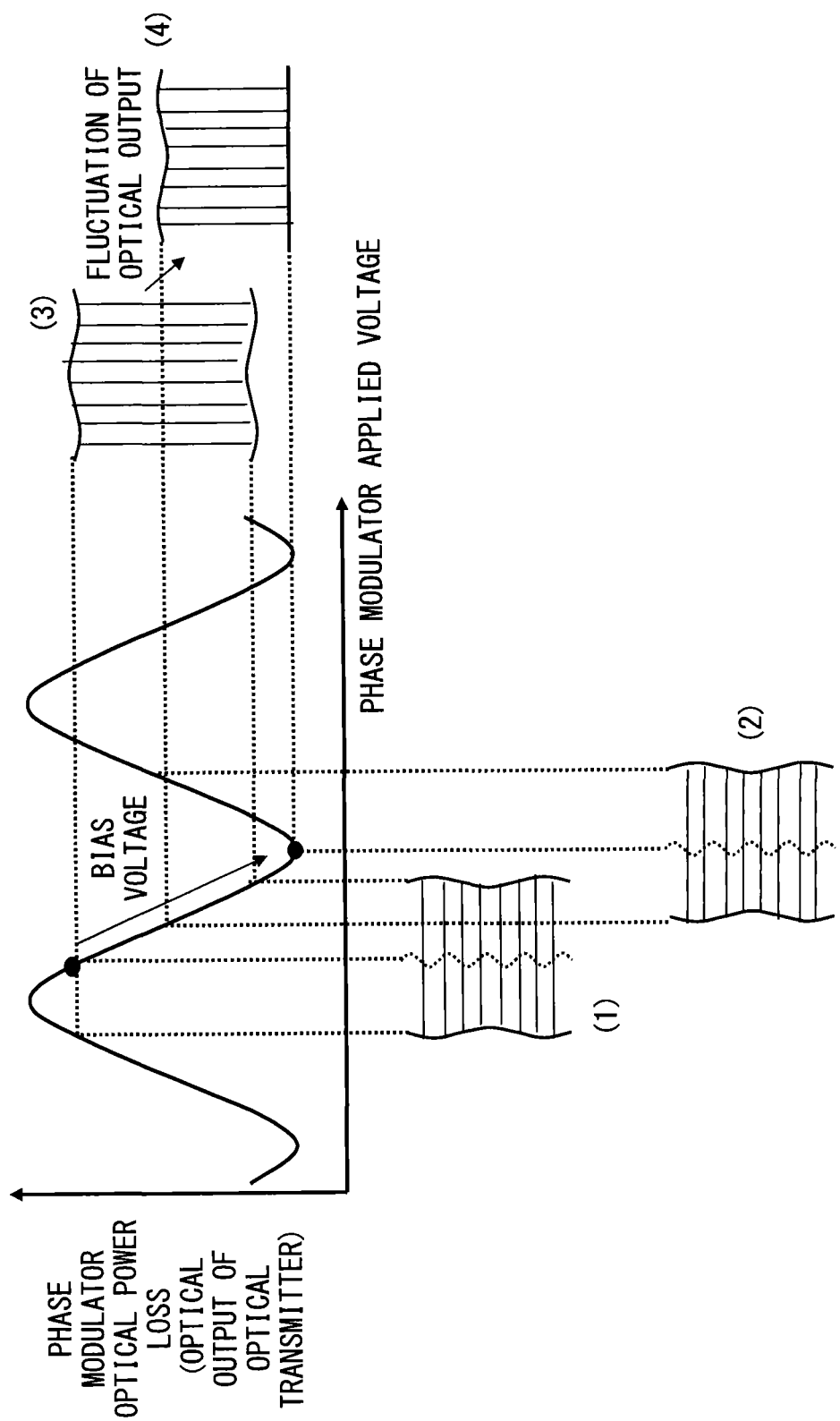
FIG. 4 explains phenomena in which a loss of the optical power in the phase modulator greatly fluctuates by a large movement of an ABC control toward a convergence point (optimal point) (No. 1).
Figure 5:
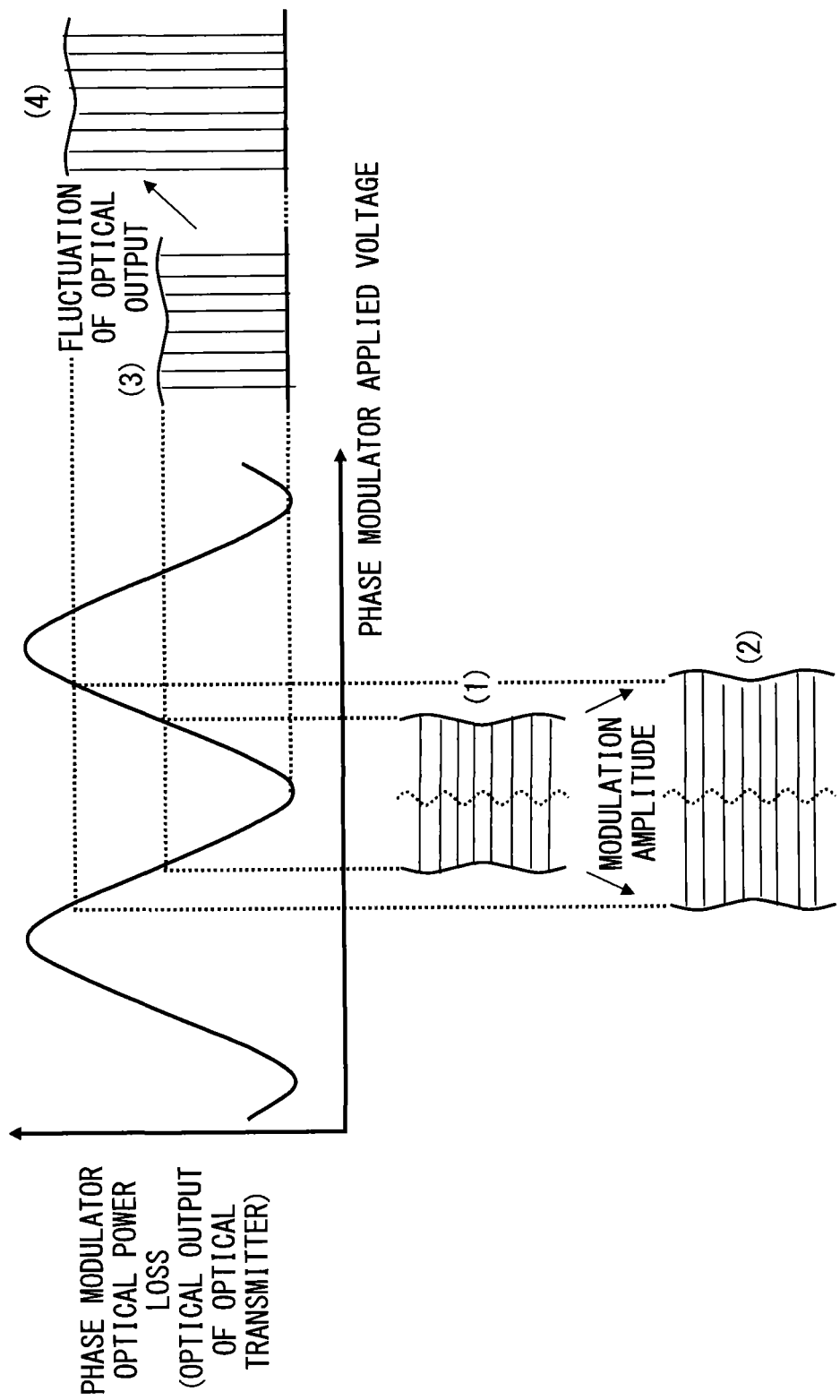
FIG. 5 explains phenomena in which a loss of the optical power in the phase modulator greatly fluctuates by a large movement of an ABC control toward a convergence point (optimal point) (No. 2).
Figure 6:
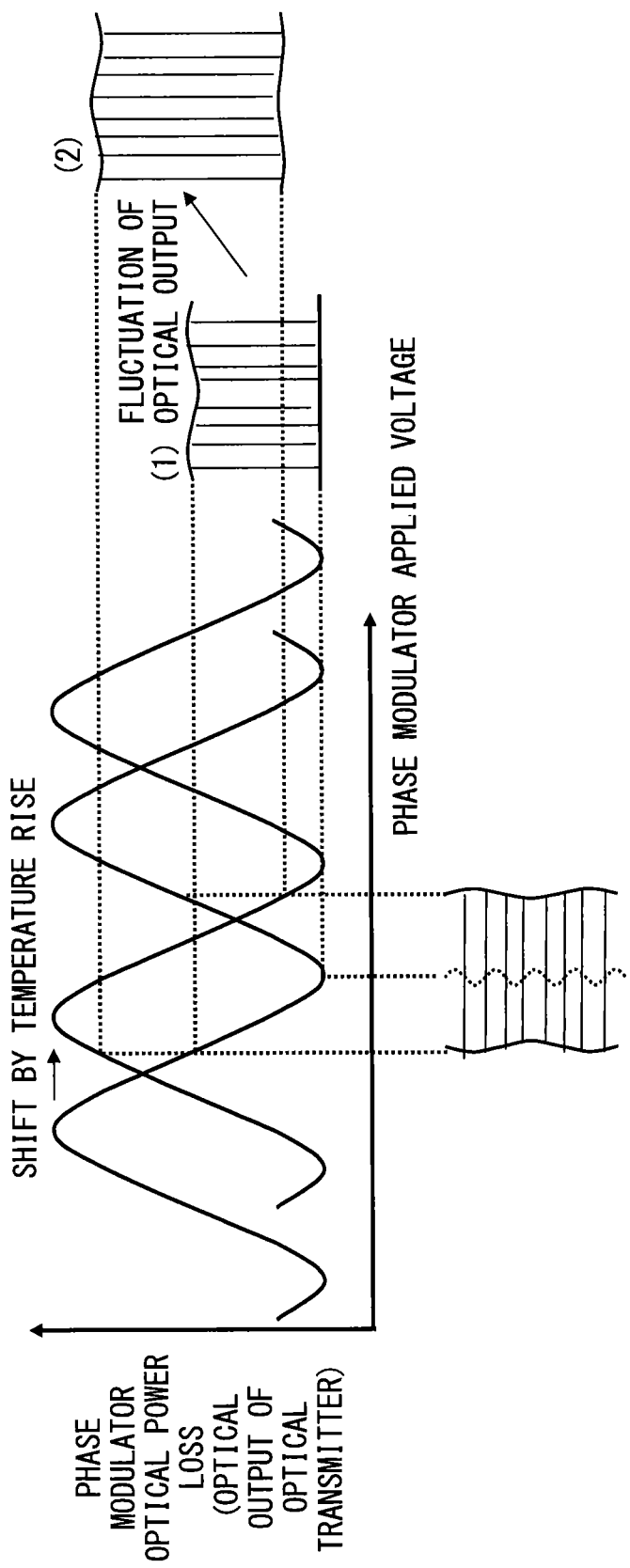
FIG. 6 explains phenomena in which a loss of the optical power in the phase modulator greatly fluctuates by a shift of optical transmission characteristics by a temperature rise FIG. 7 explains conventional problems.
Figure 7:
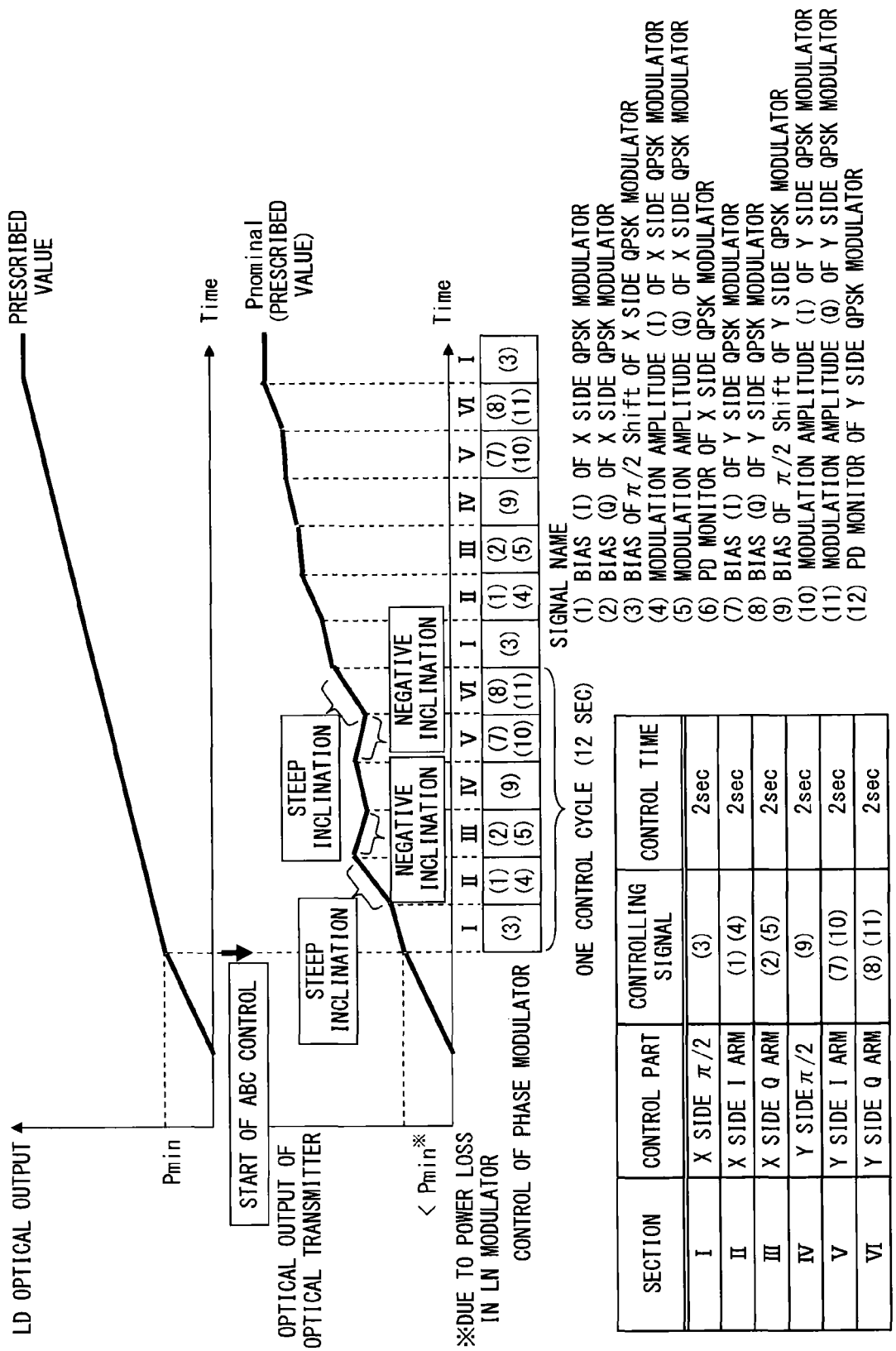
Figure 8:
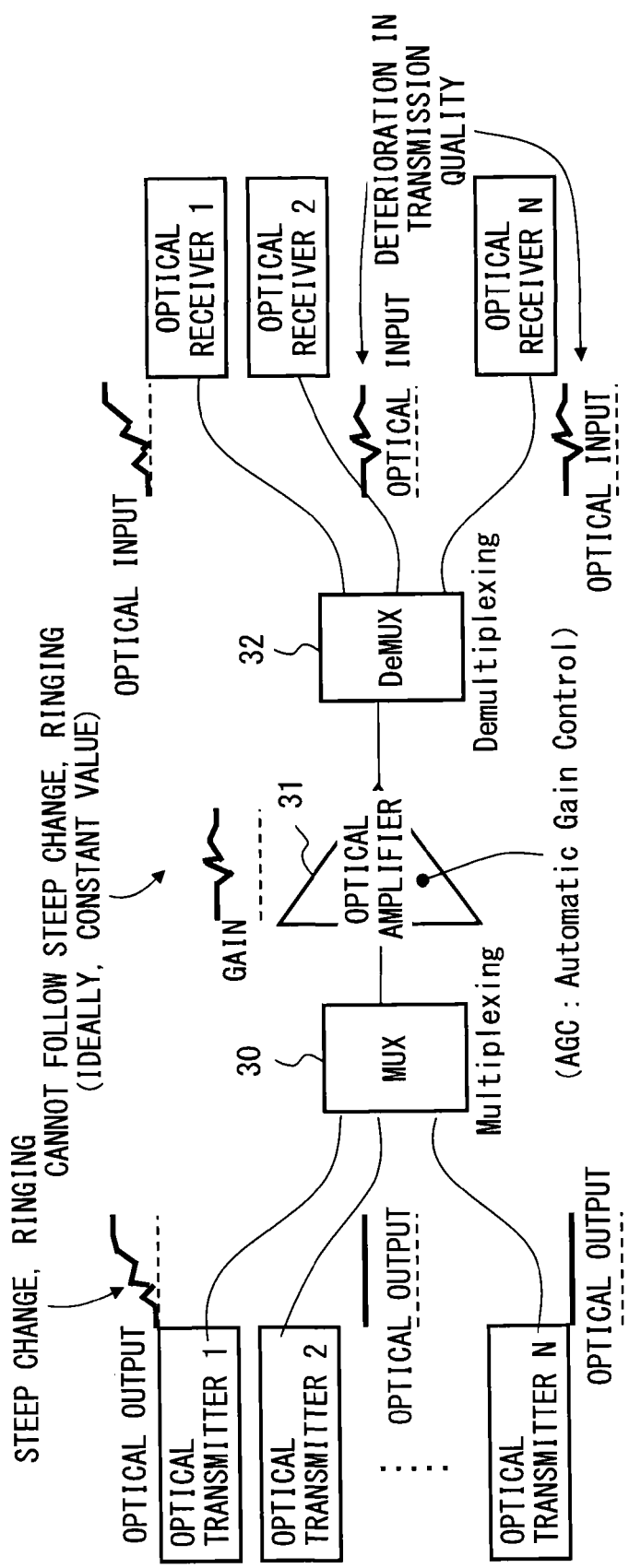
FIG. 8 explains generation of deterioration in transmission quality in a DWDM optical communication system.

When a bias voltage of a phase modulator is controlled to a convergence point (a point at which the optical output of the light transmission characteristics becomes smallest) (as illustrated in FIG. 4(2)), the optical power loss in the phase modulator changes in accordance with the modulation amplitude. In other words, the optical output from the phase modulator may be controlled by the modulation amplitude. Accordingly, as illustrated in FIG. 9, a block which increases the modulation amplitude to a prescribed value taking a predetermined time period (an amplitude increasing block 54) is added and the optical output is controlled by this block only at the startup of the optical output.

In FIG. 9, when the optical output is converted into an electric signal with a monitoring PD 44, a pilot frequency which is a low frequency of f0 is extracted in a f0 band pass filter 49 and is detected in a synchronous detection unit 48. From the result of the synchronous detection, a bias control signal is generated and is sent to a bias supply circuit 47. To the bias supply circuit 47 and the synchronous detection unit 48, frequency wave from an oscillator 55 is input, and is used for detecting the pilot frequency in the synchronous detection unit 48, and for superimposing the pilot frequency on the bias voltage in the bias supply circuit 47. The bias voltage from the bias supply circuit 47 is supplied to the bias controlling units 42-1 and 42-2 as signals (1), (2), or (7), (8) in FIG. 3.

In addition, the result of the detection obtained from the synchronous detection unit 48 and the frequency wave from the oscillator 55 are input to an amplitude controlling unit 46 and are used for controlling the amplitude of the modulation voltage. The amplitude control signal from the amplitude controlling unit 46 is sent to the driving circuits 45-1 and 45-2 as signals (4), (5), or (10), (11) in FIG. 3, and the modulation voltage applied to the modulation electrodes 41-1 and 41-2 is generated.

Further, the output of the monitoring PD 44 is used for detecting the power value of the optical output in a power monitoring unit 50. From the output of the power monitoring unit 50, a pilot frequency component is extracted by a f0 band pass filter 51, and in a synchronous detection unit 52, the pilot frequency component is detected. The result of the synchronous detection is input to a π/2 Shift bias supply circuit 53 and is supplied to a π/2 Shift bias controlling unit 43 as a signal (3) or (9). The output frequency wave of the oscillator 56 with the frequency f0 is input to the synchronous detection unit 52 and the π/2 Shift bias supply circuit 53 and is used for detecting and superimposing the pilot frequency.

An amplitude increase block 54 operates to control the amplitude of the modification voltage by a later mentioned method during the prescribed time period from the startup of the optical transmitter which includes the phase modulator (the X side or Y side QPSK modulator).

Figure 10:
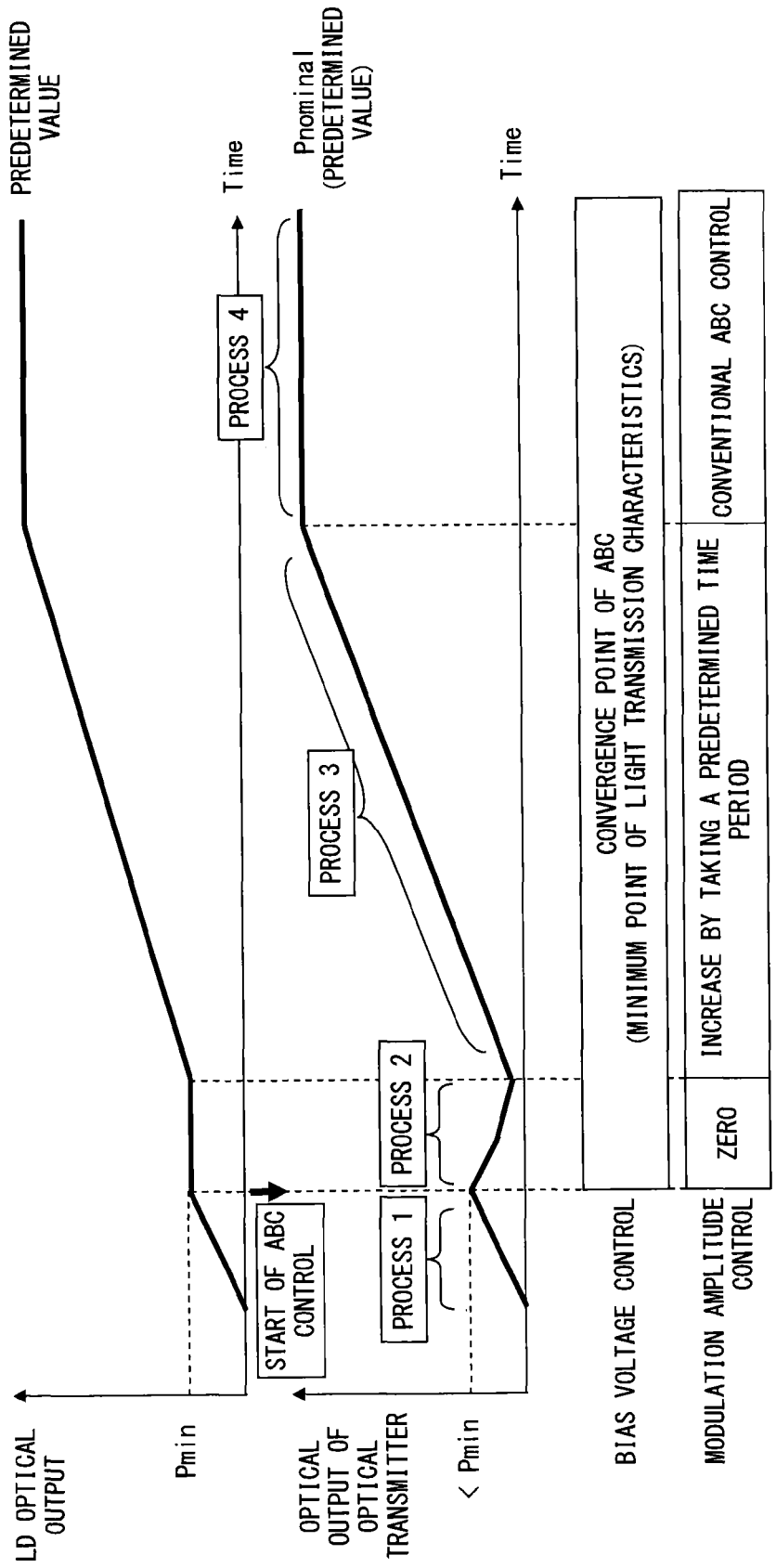
FIG. 10 explains a detailed operation of the amplitude increase block of FIG. 9 (No. 1).
Figure 11:
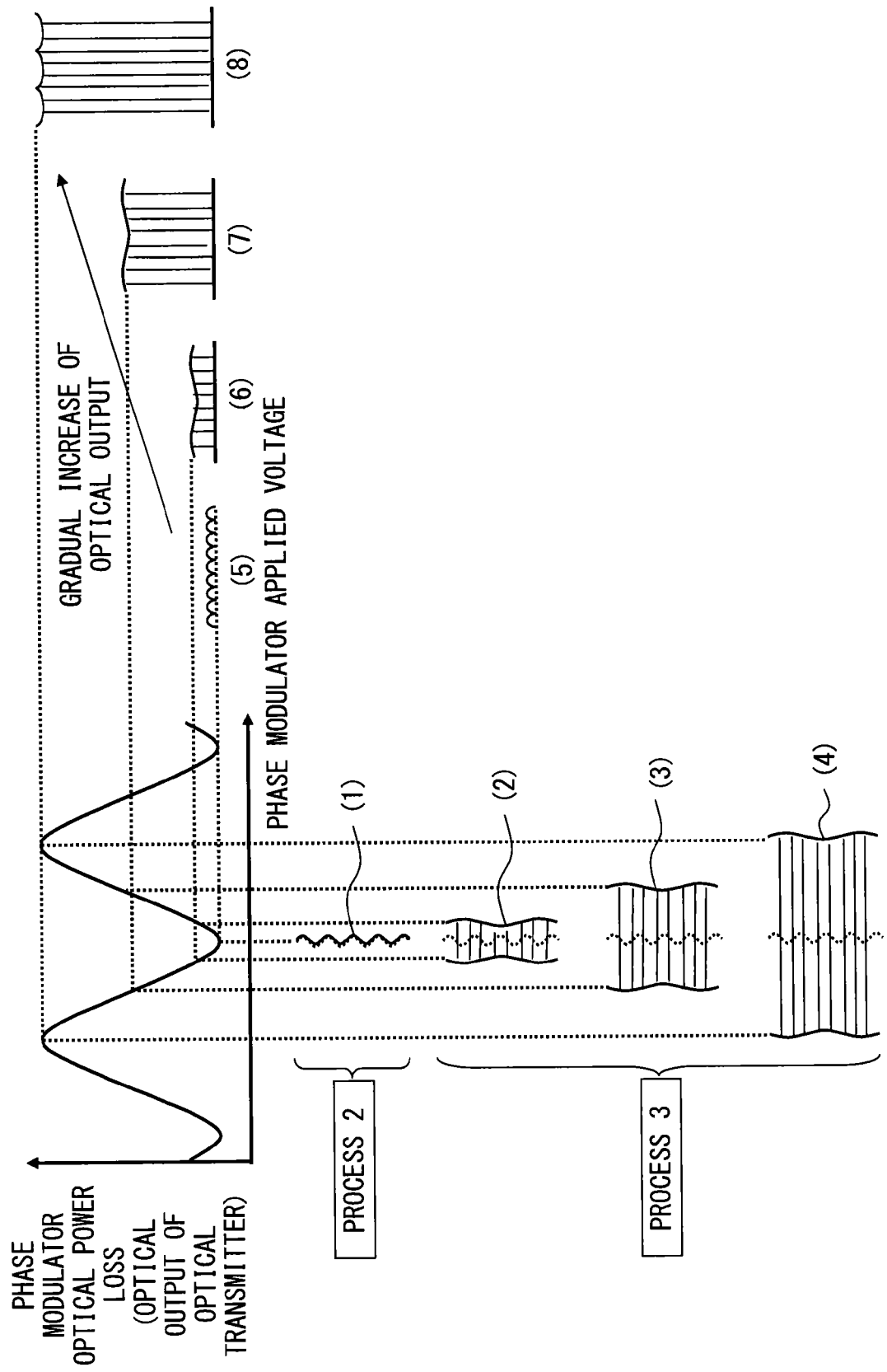
FIG. 11 explains a detailed operation of the amplitude increase block of FIG. 9 (No. 2).

FIGS. 10 and 11 explain a detailed operation of the amplitude increase block of FIG. 9.

In FIG. 10, the amplitude control processing may be divided into four phases of processes 1 to 4.

In process 1, the optical output of the LD is set as $P_{min}$. Until the optical output of the LD reaches $P_{min}$, it leaves to the operation of the LD. That is to say, since the optical amplifier which is connected to the optical transmitter via the transmission channel does not react, it has nothing to do with no matter how the optical output fluctuates.

In process 2, a bias voltage (operational point) of a phase modulator is controlled to a convergence point (a point at which the optical output of the light transmission characteristics is the smallest) by an ABC control of the bias voltage. Here, in controlling the modulation amplitude, the modulation amplitude is set as 0 as illustrated in (1). When the modulation amplitude is set as 0, the amplitude of the signal applied to the modulating electrode becomes 0, however, the amplitude of the pilot frequency is not set as 0. Accordingly, the operation for controlling the bias voltage to the convergence point by detecting the pilot frequency may be performed in a normal way.

Figure 1:
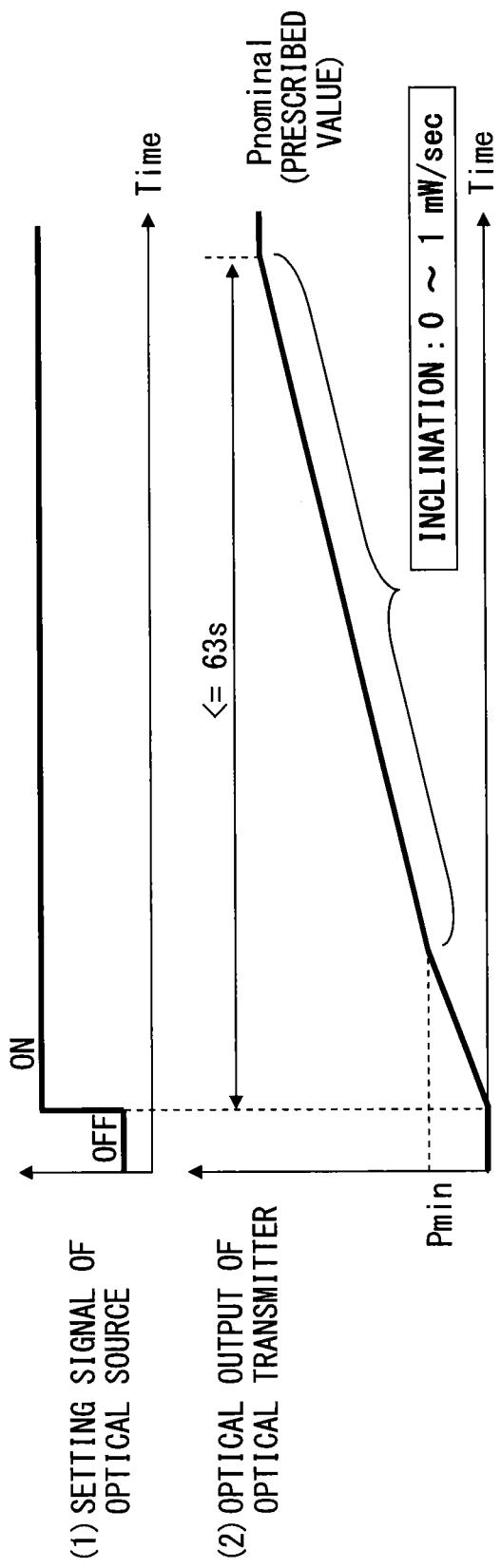
FIG. 1 illustrates one example of a specified startup of the optical output required for an optical transmitter.
Figure 2:
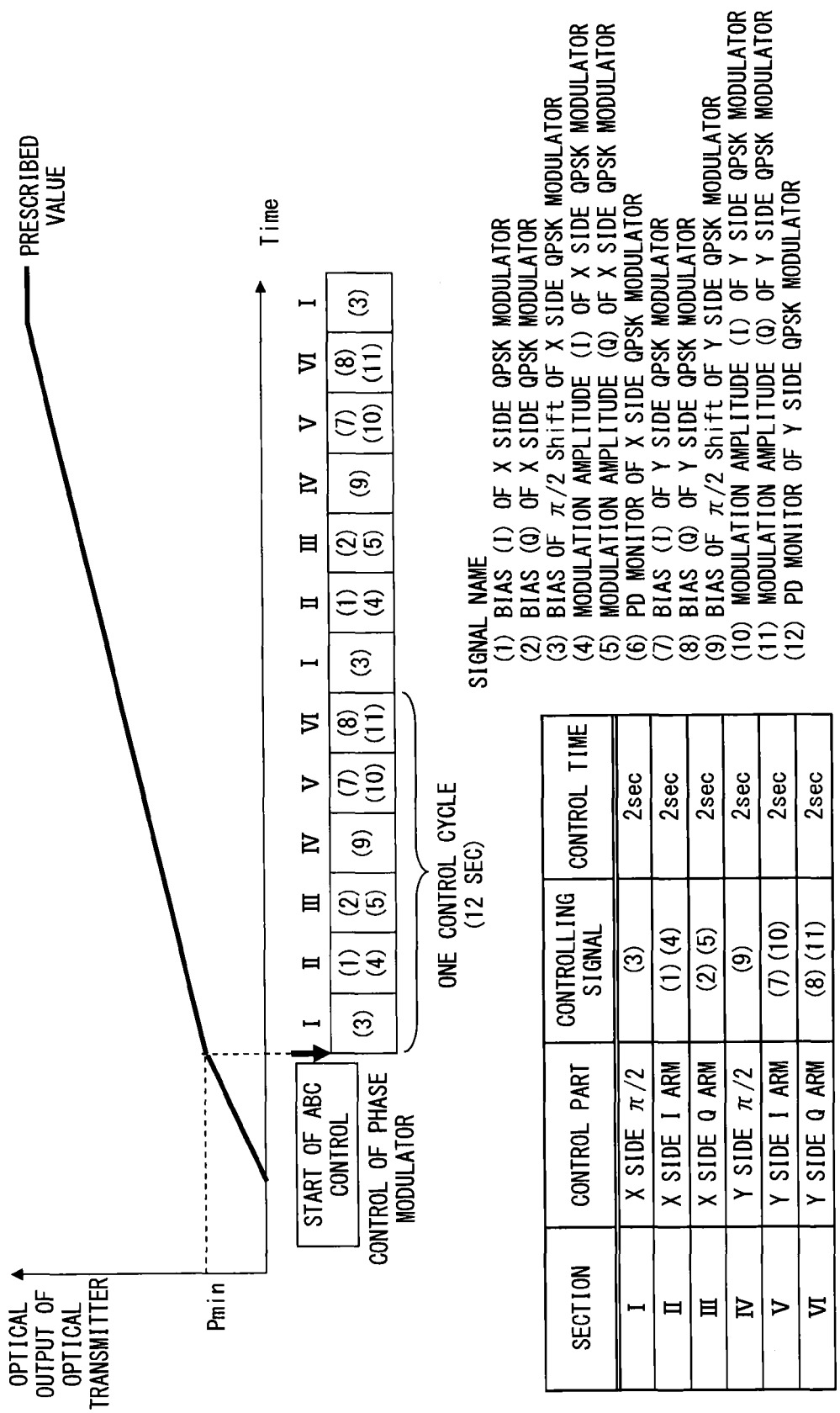
FIG. 2 explains a content of a control performed when the optical output gradually increases.

In process 3, the optical output of the optical transmitter is slowly increased by increasing the modulation amplitude taking a predetermined time period, while setting the bias voltage as the convergence point (a point at which the optical output of the light transmission characteristics becomes minimal) by the ABC control of the bias voltage during the time when the optical output of the LD linearly increases from $P_{min}$ to a prescribed value, similarly to FIG. 1 of the conventional example.

In process 4, since it is necessary to follow chronological changes of the phase modulator even after completion of the optical output startup, the conventional ABC control is performed including the control of the modulation amplitude.

According to the above mentioned control, as illustrated in FIG. 11, the voltage applied to the phase modulator (modulation voltage) gradually increases in process 3 ((2) to (4)) from the state (1) in which only the pilot frequency of the process 2 is present. Accordingly, likewise, the optical output gradually increases ((6) to (8)) from the state (1) in which only the pilot frequency component of the process 2 is present.

According to the above mentioned configuration, the optical output of the optical transmitter may be controlled by the modulation amplitude, and by increasing the modulation amplitude taking a predetermined time period, the shift of the light transmission characteristics of the phase modulator due to the temperature rise becomes milder, since the thermal effect by the heating of the driving circuit slows down. Therefore, the fluctuation of the optical power loss in the phase modulator in the section in which no bias control is performed by the time division ABC control (the section in which the voltage is kept in and after process 4) is controlled.

Further, with the increased speed of the modulation amplitude of the phase modulator, the inclination at the startup may freely be controlled. And by adjusting the increased speed of the modulation amplitude, the steep fluctuation of the optical output caused by the temperature rise in the phase modulator at the startup of the optical output may be prevented.

FIGS. 12 to 15 explain a specific configuration example of the present embodiment and its operation.

Figure 12:
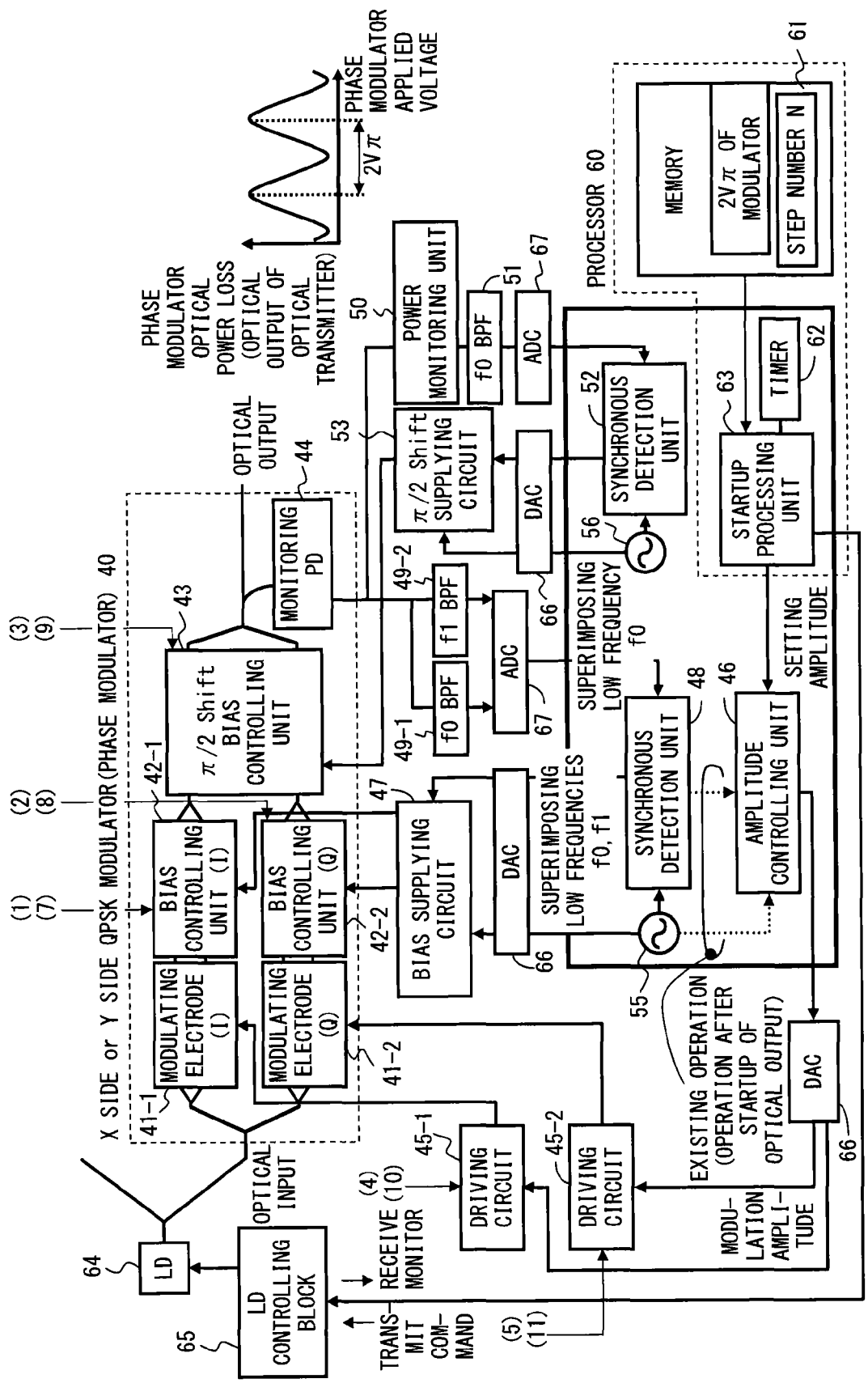
FIG. 12 explains a specific configuration example of the present embodiment and its operation (No. 1).

In FIG. 12, the same reference numerals are allotted to the same configuration elements as those in FIG. 9 and explanation thereof is omitted.

As illustrated in FIG. 12, a 2Vπ voltage value of the phase modulator, a memory 61 which stores a step number N when the modulation amplitude is gradually increased, a timer 62, and a startup processing unit 63 which uses these components to change the modulation amplitude with time, and outputs the modulation amplitude to the amplitude controlling unit 46 are provided. The 2Vπ voltage value is an applied voltage for one cycle of the light transmission characteristics (see FIG. 12, right). The timer 62 measures the time period T which is the duration of one step when the modulation amplitude is gradually increased. The timer 62 and the startup processing unit 63, together with other components that are synchronous detection units 48, 52, oscillators 55, 56, and the amplitude controlling unit 46, realize with a software executed by the processor 60. The DAC 66 is a digital to analog converter and the ADC 67 is an analog to digital converter. The ADC 67 is provided to convert signals between analog and digital since the detection signal of the monitoring PD 44 is an analog signal, whereas, the processing is performed by the processor 60 in a digital manner. In addition, a band pass filter 49-1 which transmits the frequency f0 and a band pass filter 49-2 which transmits the frequency f1 are provided. This is for superimposing the pilot frequency with the frequency of 0 on respective arms of the I signal and the Q signal of the phase modulator 40 on one side, and for superimposing the pilot frequency with the frequency of f1 on the other side. By using the pilot frequencies with different frequencies for the respective arms, the states of the arms of the I signal and of the Q signal may be detected at a time, and therefore, the bias control for the respective arms may be performed at a time.

Figure 13:
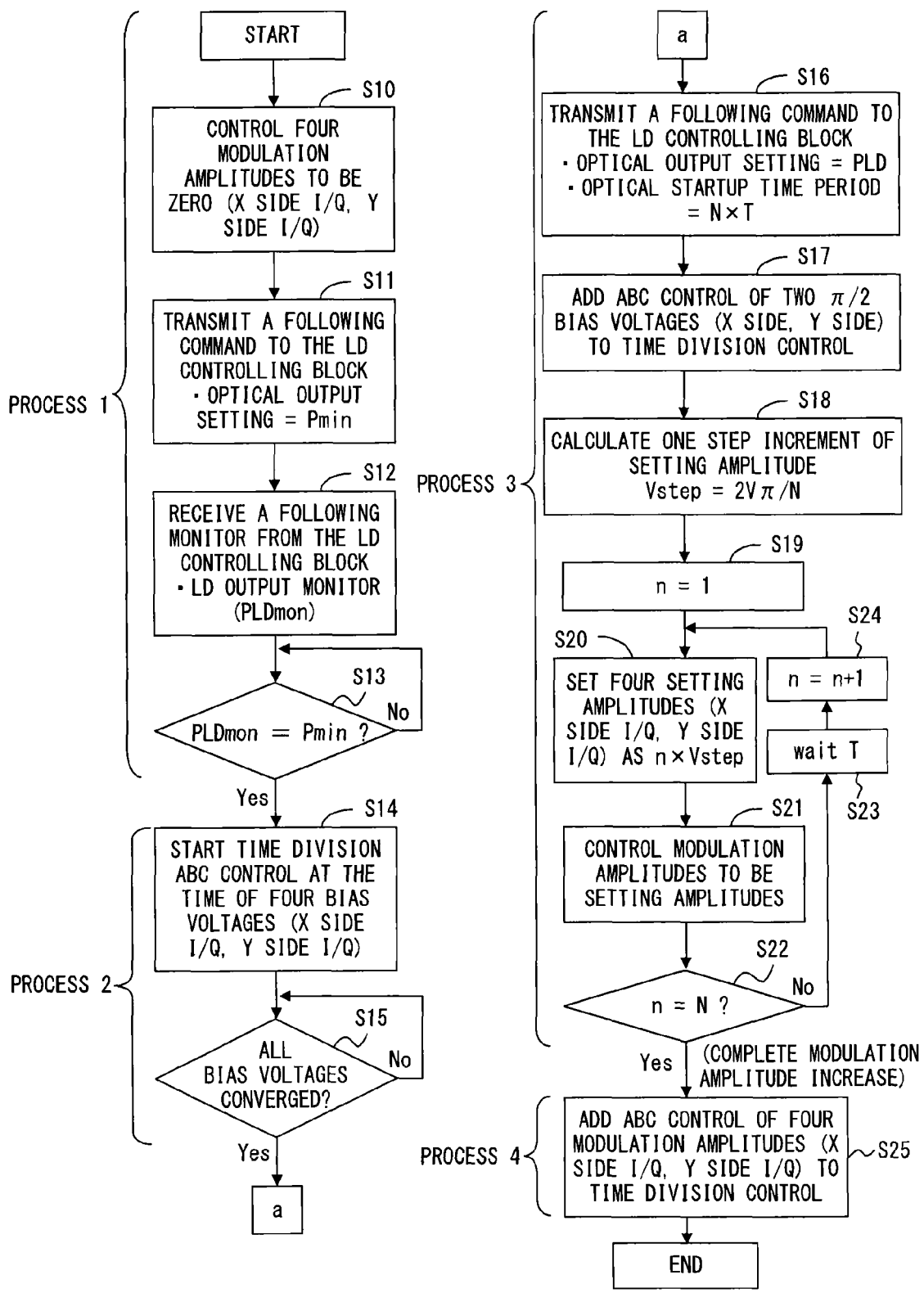
FIG. 13 explains a specific configuration example of the present embodiment and its operation (No. 2).
Figure 14:
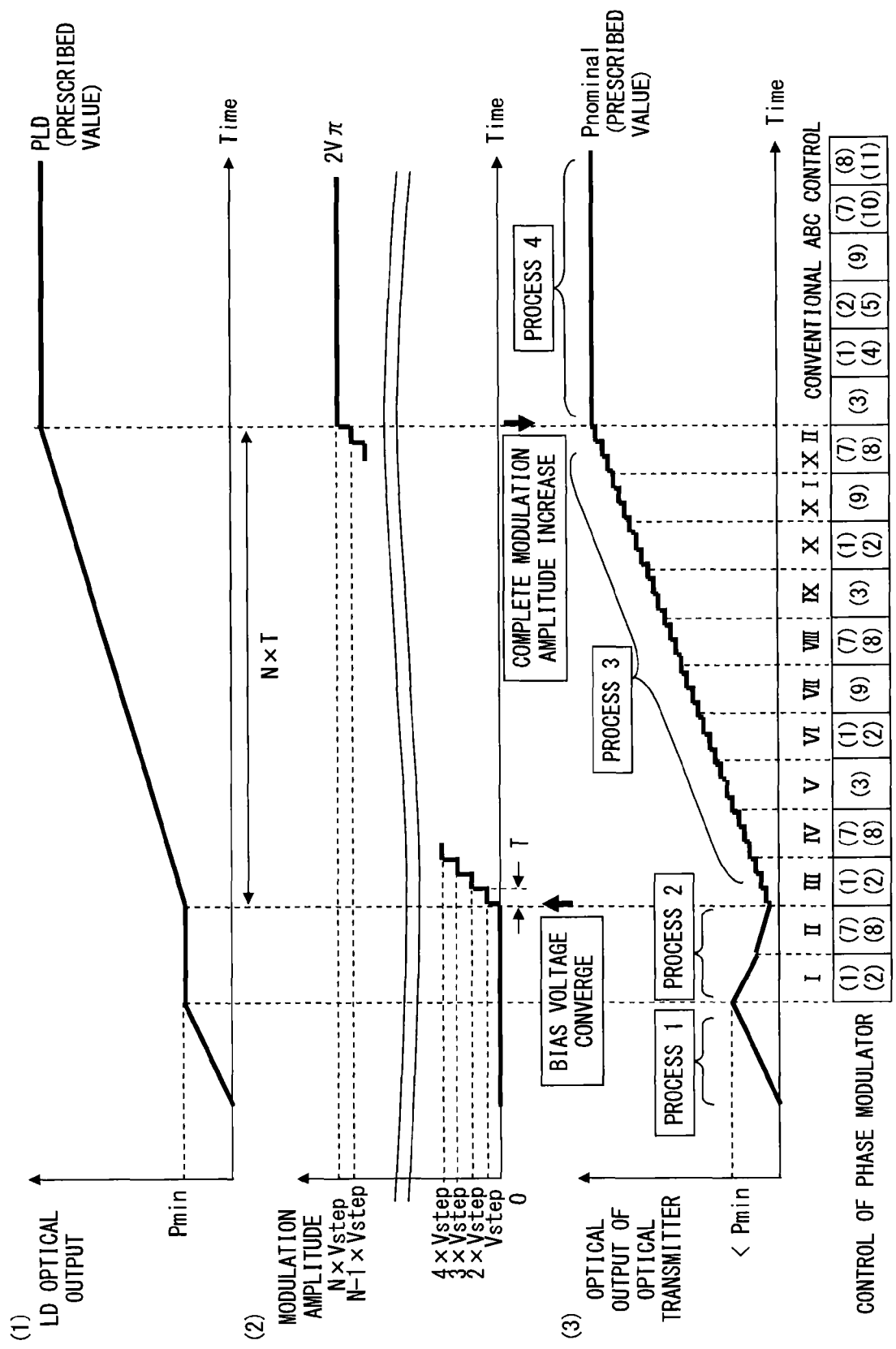
FIG. 14 explains a specific configuration example of the present embodiment and its operation (No. 3).

Then, the processor 60 performs processing by the following sequence (for details, see FIG. 13) and starts up the optical output as illustrated in FIG. 14

(Process 1) In the amplitude controlling unit 46, the four modulation amplitudes (X side I/Q signals, Y side I/Q signals) input to the phase modulator are set as 0. Subsequently, the startup processing unit 63 transmits a command of setting the optical output as $P_{min}$, to the LD controlling block 65 which is capable of controlling the optical output of the LD 64 or outputting the output state of the LD 64 in response to the external command. And then, it confirms that the LD output monitoring value ($PDL_{mon}$) received from the LD controlling block 65 is up to $P_{min}$.

(Process 2) The synchronous detection unit 48 starts the time division ABC control of the bias voltage of the phase modulator. In this process, the LD optical output is kept $P_{min}$-constant. The I side bias voltage control and the Q side voltage control superimpose signals with different two types of pilot frequencies (f0, f1) on the respective arms and performs control at a time by detecting these, and set all the bias voltages as the convergence point (minimum point of light transmission characteristics) (sections I and II of FIG. 14).

(Process 3) The startup processing unit 63 transmits the command of setting the optical output as the prescribed value and the command of setting the startup time as N×T to the LD controlling block 65. Subsequently, the startup processing unit 63 adds the ABC control of the π/2 Shift bias voltage of the phase modulator which is performed by the synchronous detection unit 52 to the time division control. And then, the startup processing unit 63 reads the 2Vπ voltage value and step number N of the phase modulator from the memory 61, and calculates the one step increment $V_{step}$ ($=2V\pi/N$) of a setting amplitude. Here, the setting amplitude is the target amplitude which is set when controlling the modulation amplitude. Then, the startup processing unit 63 increases the set amplitude from the initial value 0 by each $V_{step}$ for every cycle T of the timer 62, while the amplitude controlling unit 46 controls the modulation amplitude to be the setting amplitude. And after increase by N steps (when the setting amplitude becomes $N \times V_{step} = 2V\pi$), the amplitude increase is completed (sections III and XII of FIG. 14)

(Process 4) Afterward, the time division ABC control including the modulation amplitude control is performed as before.

FIG. 13 is a flowchart illustrating the processing performed by the processor 60 according to the present embodiment.

In step S 10, the four modulation amplitudes which are the X side I signal arm, the X side Q signal arm, the Y side I signal arm, and the Y side Q signal arm are controlled to be 0. In step S 11, a command of setting the optical output of the LD as up to $P_{min}$, to the LD controlling block 65 is transmitted from the processor 60. In step S 12, the LD output monitoring value ($PLD_{mon}$) is received by the processor 60 from the LD controlling block 65. In step S 13, it is judged whether or not $PLD_{mon}$ equals $P_{min}$. If No in the judgment in step S 13, the judgment of step S 13 is repeated until $PLD_{mon}$ becomes $P_{min}$. If Yes in the judgment in step S 13, in step S 14, the time division ABC control of the four bias voltages which are the X side I signal arm, the X side Q signal arm, the Y side I signal arm, and the Y side Q signal arm is started.

In step S 15, it is judged whether or not all the bias voltages have converged (in the state as illustrated in FIG. 11 (1)). If No in the judgment in step S 15, the ABC control is continued until all the bias voltages converge, and repeats the judgment of step S 15. If Yes in the judgment in step S 15, it moves into step S 16.

In step S 16, a command of setting the LD optical output as the prescribed value PLD and of setting the LD startup time as N×T is transmitted to the LD controlling block 65. In step S 17, the time division ABC control of the two π/2 bias voltages in the X side and the Y side is added. In step S 18, the increment of one step of the setting amplitude is calculated by $V_{step} = 2V\pi/N$. In step S 19, the variable n is set as 1. In step S 20, the four modulation amplitudes of the X side I signal arm, the X side Q signal arm, the Y side I signal arm, and the Y side Q signal arm are set as $N \times V_{step}$, and in step S 21, four of these modulation amplitudes are controlled to be the setting amplitudes. In step S 22, it is judged whether or not n becomes N. If No in the judgment in step S 22, after waiting for a time period T in step S 23, n is added by one in step S 24, and goes back to step S 20. If Yes in the judgment in step S 22, four modulation amplitudes of the X side I signal arm, the X side Q signal arm, the Y side I signal arm, and the Y side Q signal arm are added to the time division ABC control in step S 25 and the processing is completed.

As mentioned above, N and T are the values to be determined by the system specifications to which the actual devices are applied and are appropriately designed by system designers.

FIGS. 14 and 15 explain a change in the optical output by the control of the present embodiment and the time division ABC control.

FIG. 15 lists up control parts, control signals, control time, and signal names in each section in FIG. 14 and it is advised to see FIG. 15 together with FIG. 14.

In FIG. 14, as illustrated in (1), the LD optical output initially rises to $P_{min}$ and is maintained as $P_{min}$ during the time period when process 2 is executed, and after that, it is controlled by the LD controlling block so as to increase $P_{min}$ to the prescribed value by taking time period of N×T. As illustrated in (2), the modulation amplitude is gradually increased until it reaches $2V\pi$ in process 3, with a fluctuation range of $V_{step}$ and divided into N steps.

(3) is an optical output of the optical transmitter. In process 1 in which the LD optical output starts to be output, the optical output of the optical transmitter rises to $P_{min}$. When process 2 is started, the bias point which was shifted from the minimum point of the light transmission characteristics of the phase modulator reaches the minimum point (becomes the state as illustrated in FIG. 11 (1)), and therefore, as seen from FIG. 4, the optical output becomes smaller. Subsequently, when process 3 is started, the optical output gradually increases stepwise, until it reaches $P_{nominal}$ (prescribed value). At this time, the modulation amplitude in the phase modulator is $2V\pi$. After that, process 4 follows, in which the ABC control is performed as before.

In process 2, as an example, sections I and II of the time division control are allotted. In section I, the biases of the I signal arm and the Q signal arm in the X side QPSM modulator are controlled ((1), (2)). In section II, the biases of the I signal arm and the Q signal arm in the Y side QPSM modulator are controlled ((7), (8)). By process 2, the bias voltage is set as the minimum point of the light transmission characteristics of the phase modulator.

In process 3, as an example, sections III to XII are allotted. In section III, similarly to section I, the biases of the I signal arm and the Q signal arm of the X side QPSM modulator are controlled ((1), (2)). In section VI, similarly to section II, the biases of the I signal arm and the Q signal arm of the Y side QPSM modulator are controlled ((7), (8)). In section V, the bias of the π/2 Shift of the X side QPSM modulator is controlled ((3)). In section VI, similarly to section I, the biases of the I signal arm and the Q signal arm of the X side QPSM modulator are controlled ((1), (2)). In section VII, the bias of the π/2 Shift of the Y side QPSK modulator is controlled ((9)). In section VIII, similarly to section II, the biases of the I signal arm and the Q signal arm of the Y side QPSM modulator are controlled ((7), (8)). In section IX, similarly to section V, the bias of the π/2 Shift of the X side QPSM modulator is controlled ((3)). In section X, similarly to section I, the biases of the I signal arm and the Q signal arm of the X side QPSM modulator are controlled ((1), (2)). In section XI, similarly to section VII, the bias of the π/2 Shift of the Y side QPSK modulator is controlled ((9)). In section XII, similarly to section II, the biases of the I signal arm and the Q signal arm of the Y side QPSM modulator are controlled ((7), (8)).

The time division control between sections III to XII is performed during the time when the modulation amplitude is gradually increased. Since the modulation amplitude becomes the maximum upon completion of process 3, after that, the ABC control is performed as before.

FIGS. 16 to 20 explain another specific configuration example of the present embodiment.

Figure 16:
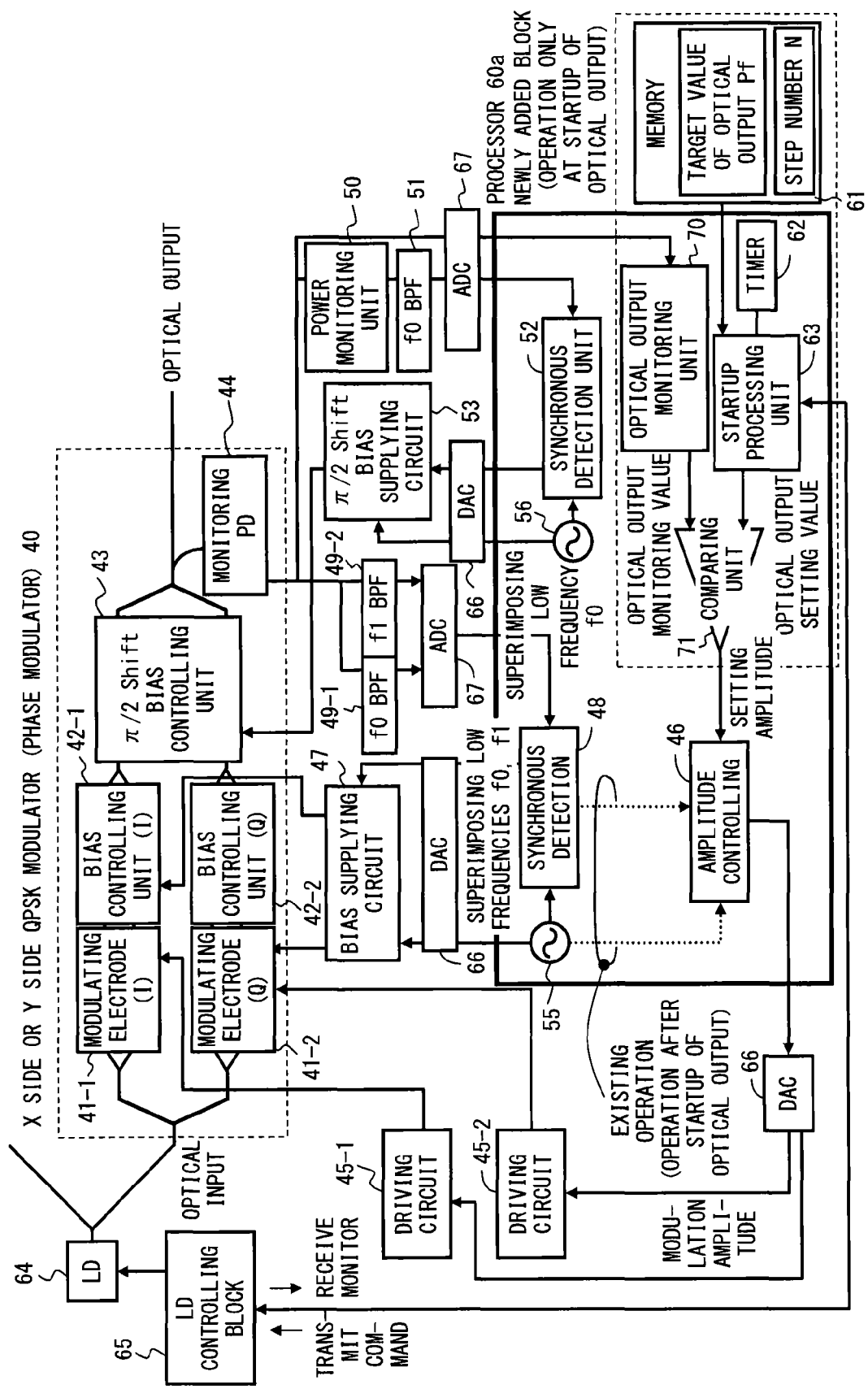
FIG. 16 explains another specific configuration example of the present embodiment (No. 1).

In FIG. 16, the same reference numerals are allotted to the same configuration elements as those in FIG. 12 and explanation thereof is omitted.

As illustrated in FIG. 16, a memory 61 which stores a target value Pf of the optical output and a step number N, and a timer 62, a startup processing unit 63 for obtaining the optical output setting value by using the memory 61 and the timer 62, an optical output monitoring unit 70, and a comparing unit 71 which compares the optical output monitoring value output by the optical output monitoring unit 70 with the optical output setting value output by the startup processing unit 63, and which determines the increase or decrease direction of the setting amplitude to the amplitude controlling unit 46 are provided. These are realized, together with synchronous detection units 48, 52, oscillators 55, 56, and the amplitude controlling unit 46, by software executed by the processor 60a.

Figure 18A:
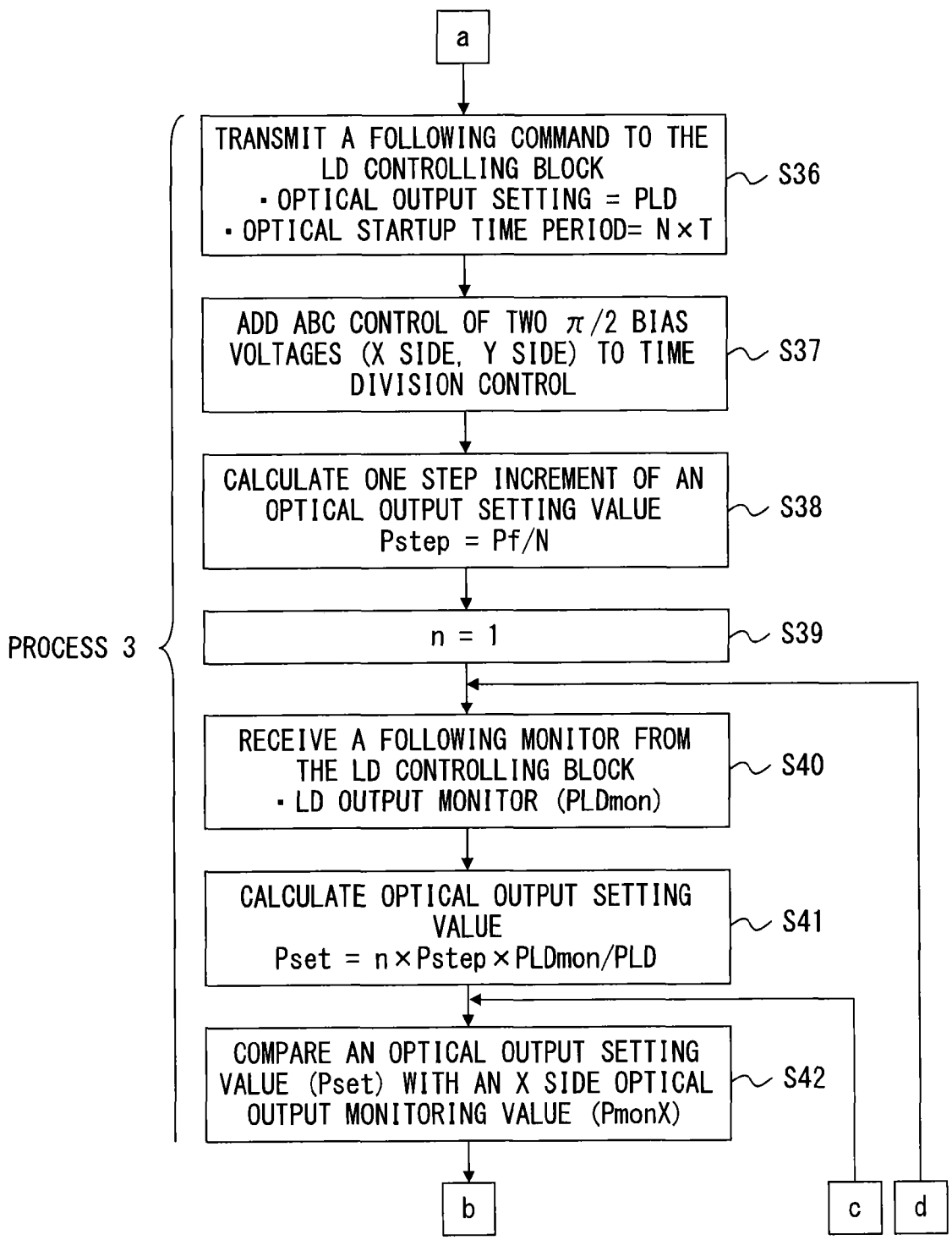
FIG. 18A explains another specific configuration example of the present embodiment (No. 3).
Figure 18B:
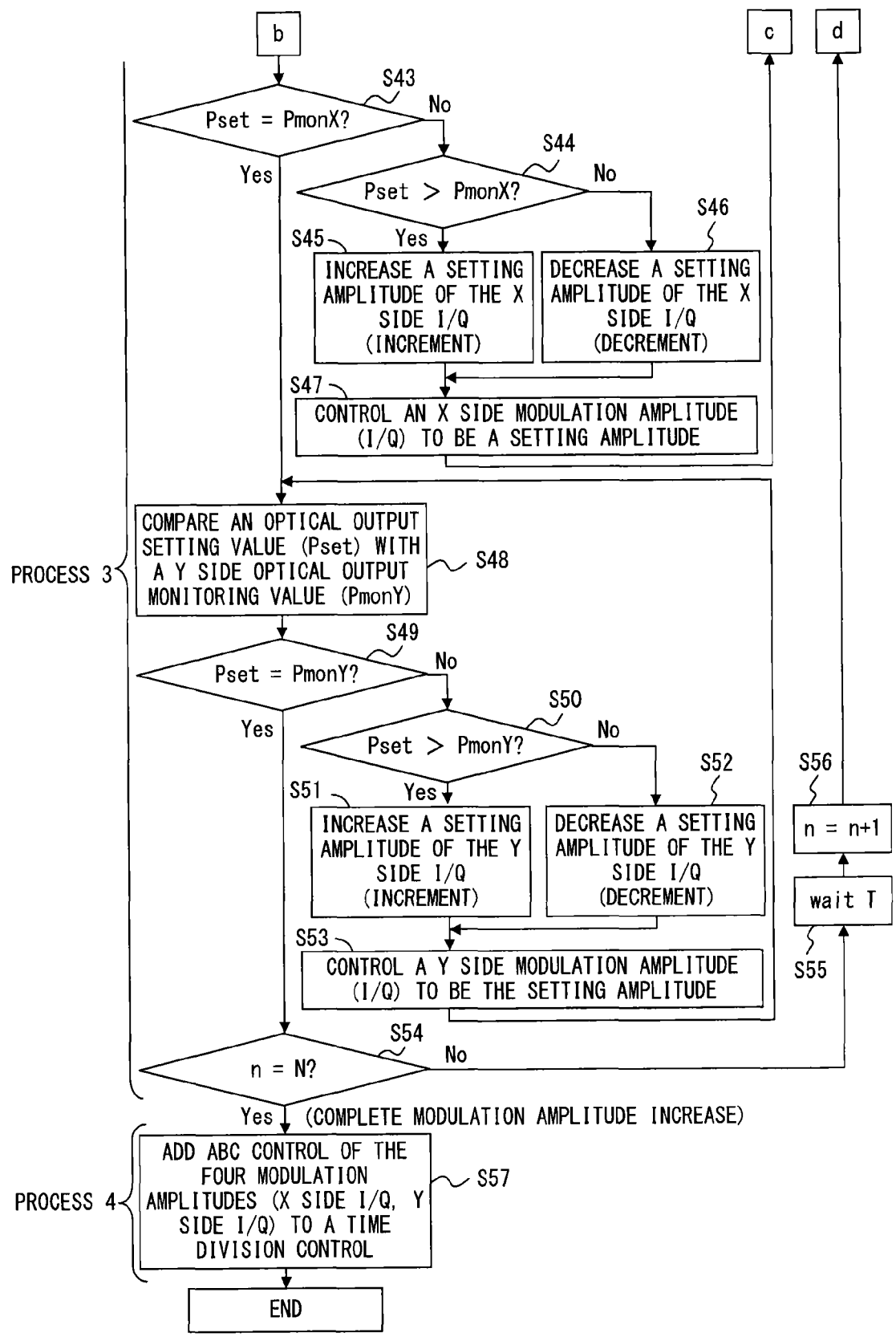
FIG. 18B explains another specific configuration example of the present embodiment (No. 4).
Figure 19:
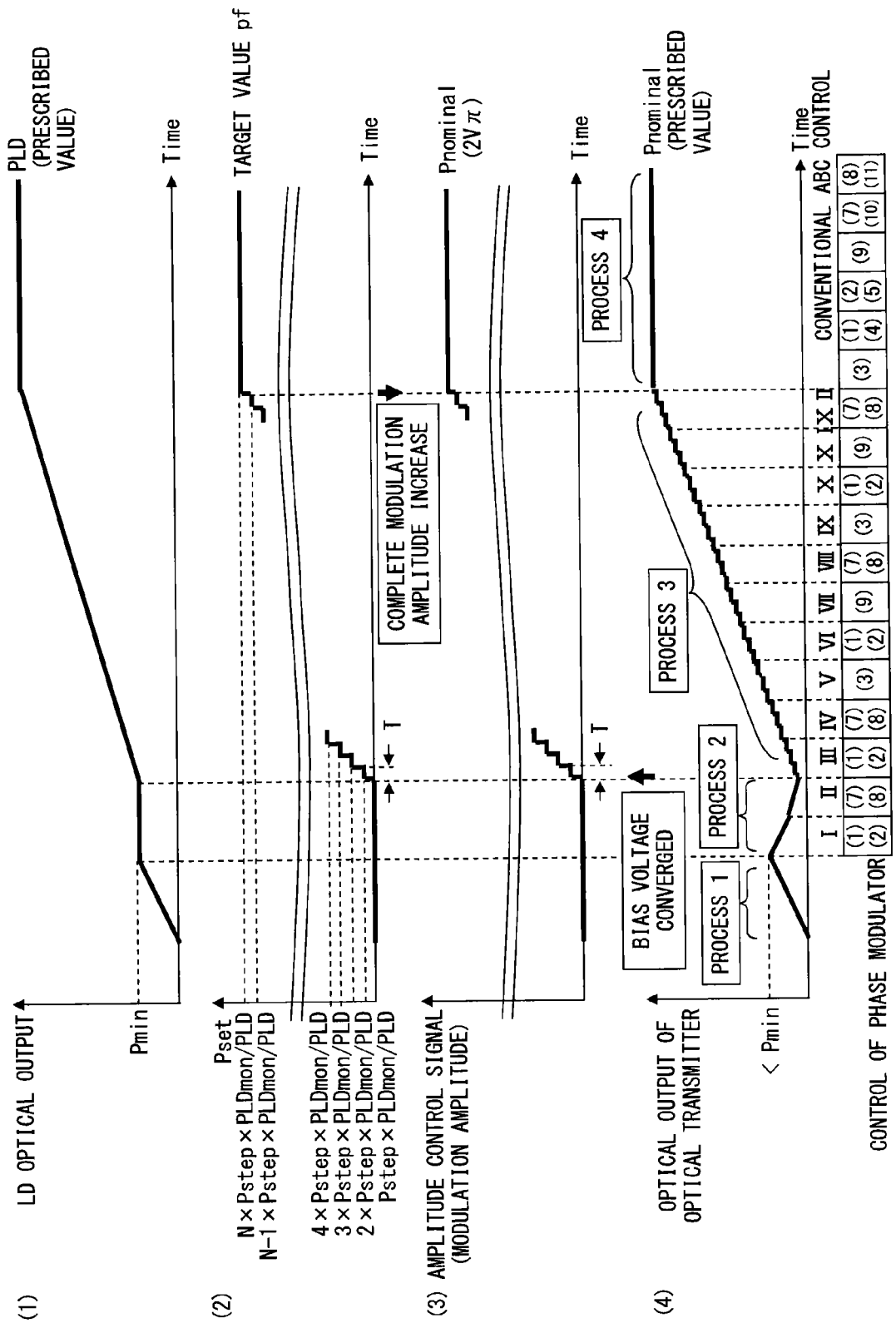
FIG. 19 explains another specific configuration example of the present embodiment (No. 5).

Then, the processor 60a performs processing by the following sequence (for details, see FIGS. 17, 18A, and 18B) and starts up the optical output as illustrated in FIGS. 19 and 20.

(Process 1) The same as illustrated in FIG. 13

(Process 2) The same as illustrated in FIG. 13 (sections I, II)

(Process 3) The startup processing unit 63 transmits a command of setting the optical output as the prescribed value PLD and the command of setting the startup time period as N×T, to the LD controlling block 65. Subsequently, the ABC control with the two π/2 bias voltages of the phase modulator performed in the synchronous detection unit 52 is added to the time division control. After that, the startup processing unit 63 reads the target value Pf of the optical output and the step number N from the memory 61, and calculates the one step increment $P_{step}$ (=Pf/N) of the optical output setting value. Then, (1) the startup processing unit 63 calculates the optical output setting value ($P_{set}$=n×$P_{step}$×$PLD_{mon}$/PLD) which considers the optical output state of the LD (a level at a process for increase) by using the LD output monitoring value ($PLD_{mon}$) received from the LD controlling block 65.

(2) A comparing unit 71 compares the optical output monitoring value and the optical output setting value in the X side, and based on the result, increases or decreases the setting amplitude of the X side I/Q signal, and the amplitude controlling unit 46 controls the modulation amplitude to be the setting amplitude. This processing is performed until the optical output monitoring value equals the optical output setting value.

(3) Likewise, in the Y side, the same processing as the above mentioned (2) is performed.

For every cycle T of the timer 62, the processing of (1) to (3) is performed by increasing the optical output setting value by $P_{step}$ and after the increase of N steps, the amplitude increase is completed (sections III to XII).

(Process 4) Afterwards, the time division ABC control is performed which includes the modulation amplitude control as well, as before.

Figure 17:
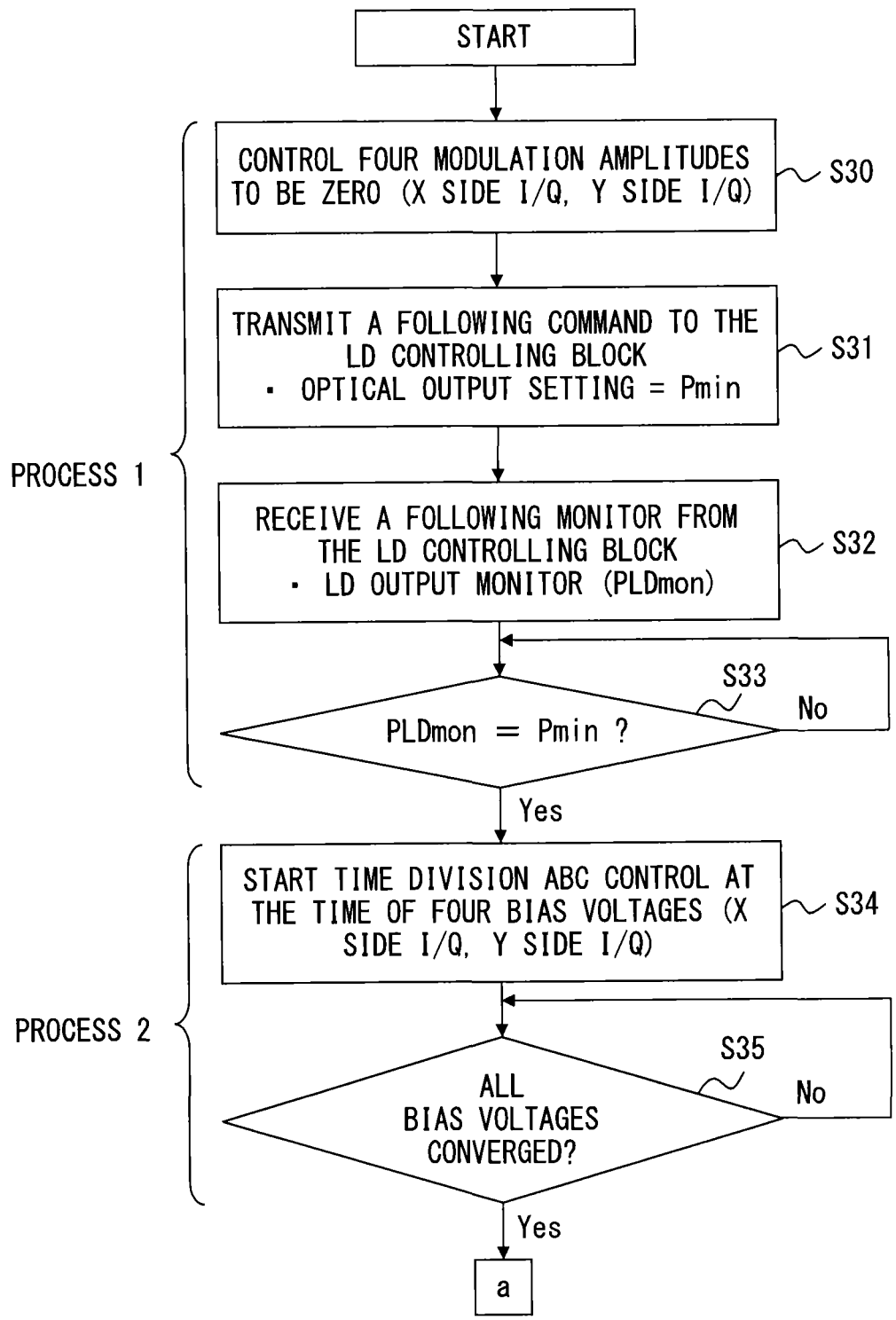
FIG. 17 explains another specific configuration example of the present embodiment (No. 2).

FIGS. 17 to 18B are flowcharts of the processing performed by the processor in the present configuration examples.

In step S 30, the four modulation amplitudes of the X side I signal arm, the X side Q signal arm, the Y side I signal arm, and the Y side Q signal arm are controlled to be 0. In step S 31, a command of setting the optical output as $P_{min}$ to the LD controlling block 65 is transmitted from a processor 60a. In step S 32, the processor 60a receives the LD output monitoring value ($PLD_{mon}$) from the LD controlling block 65. In step S 33, it is judged whether or not $PLD_{mon}$ equals $P_{min}$. If No in the judgment in step S 33, it repeats the judgment of step S 33 until $PLD_{mon}$ becomes $P_{min}$. If Yes in the judgment in step S 33, in step S 34, the time division ABC control of the four bias voltages which are the X side I signal arm, the X side Q signal arm, the Y side I signal arm, and the Y side Q signal arm is started.

In step S 35, it is judged whether or not all the bias voltages have converged. If No in the judgment in step S 35, the ABC control is continued and the judgment in step S 35 is repeated. If Yes in the judgment in step S 35, it moves into step S 36.

In step S 36, a command of setting the LD optical output as the prescribed value PLD and of setting the LD startup time period as N×T is transmitted to the LD controlling block 65. By setting the LD optical output as PLD, and by setting the optical startup time period as the N×T, the LD performs the operation of gradually increasing the optical output taking time period of the N×T until the optical output becomes PLD from $P_{min}$. In step S 37, the time division ABC control with the two π/2 bias voltages in the X side and the Y side is added. In step S 38, the increment of one step of the optical output setting value $P_{step}$=Pf/N is calculated. Here, Pf is an optical output value when the LD optical output becomes PLD and when the modulation amplitude becomes 2Vπ. This is determined in advance by carrying out measurement. Accordingly, when the LD optical output is smaller than PLD or when the modulation amplitude is smaller than 2Vπ, the optical output of the phase modulator does not reach Pf. In step S 39, variable n is set as 1. In step S 40, from the LD controlling block 65, the output monitoring value of the LD ($PLD_{mon}$) is received. In step S 41, the optical output setting value is calculated by $P_{set}$=n×$P_{step}$×$PLD_{mon}$/PLD. In this formula, the size $P_{step}$ of one step when the LD optical output is PLD is reduced by the ratio of the current LD optical output $PLD_{mon}$ to PLD.

In step S 42, the optical output setting value ($P_{set}$) and the optical output monitoring value in the X side ($P_{mon}$X) are compared. In step S 43, it is judged whether or not the $P_{set}$ equals $P_{mon}$X. If Yes in the judgment in step S 43, it moves into step S 48. If No in the judgment in step S 43, in step S 44, it is judged whether or not the $P_{set}$ is larger than $P_{mon}$X. If Yes in the judgment in step S 44, in step S 45, the setting amplitude of the modulation signal of the X side I/Q signal is increased, and it moves into step S 47. The value of the setting amplitude is stored in the memory (not illustrated) in the amplitude controlling unit 46. Although the size in the increase of the setting amplitude depends on the configuration of the amplitude controlling unit 46, one bit of the digital value designated in setting the setting amplitude is changed. If No in the judgment in step S 44, in step S 46, the setting amplitude of the driving signal of the X side I/Q signal is decreased, and it moves into step S 47. Although the size in the decrease of the setting amplitude depends on the configuration of the amplitude controlling unit 46, one bit of the digital value designated in setting the setting amplitude is changed. In step S 47, the modulation amplitude of the X side I/Q signal is controlled to be the setting amplitude, and it goes back to step S 42. In steps S 45 and S 46, by changing the setting amplitude by one bit, the modulation amplitude is controlled to be the setting amplitude, and in step S 47, it is judged whether or not $P_{set}$ equals $P_{mon}$X and repeats steps S 42 through S 47 until $P_{set}$ equals $P_{mon}$X.

In step S 48, the optical output setting value ($P_{set}$) and the optical output monitoring value in the Y side ($P_{mon}$Y) are compared. In step S 49, it is judged whether or not the $P_{set}$ equals $P_{mon}$Y. If Yes in the judgment in step S 49, it moves into step S 54. If No in the judgment in step S 49, in step S 50, it is judged whether or not the $P_{set}$ is larger than $P_{mon}$Y. If Yes in the judgment in step S 50, in step S 51, the setting amplitude of the driving signal of the Y side I/Q signal is increased, and it moves into step S 53. Although the size in the increase of the setting amplitude depends on the configuration of the amplitude controlling unit 46, one bit of the digital value designated in setting the setting amplitude is changed. If No in the judgment in step S 50, in step S 52, the setting amplitude of the driving signal of the Y side I/Q signal is decreased, and it moves into step S 53. Although the size in the decrease of the setting amplitude depends on the configuration of the amplitude controlling unit 46, one bit of the digital value designated in setting the setting amplitude is changed. In step S 53, the modulation amplitude of the Y side I/Q signal is controlled to be the setting amplitude, and it goes back to step S 48. In steps S 51 and S 52, by changing the setting amplitude by one bit, the modulation amplitude is controlled to be the setting amplitude and in step S 48, it is judged whether or not $P_{set}$ equals $P_{mon}Y$ and repeats steps S 48 through S 53 until $P_{set}$ equals $P_{mon}Y$.

In step S 54, it is judged whether or not n equals N. If Yes in the judgment in step S 54, it moves into step S 57. If No in the judgment in step S 54, in step S 55, it waits for a time period of T, and in step S 56, n is increased by one and it goes back to step S 40. Here, when it goes back to step S 40, again, the LD output monitoring value $PLD_{mon}$ is acquired, and in step S 41, by following formula $P_{set}=n \times P_{step} \times PLD_{mon}/PLD$, the next optical output setting value is determined. Here, in addition to the increase of n by one in step S 56, a new LD output monitoring value $PLD_{mon}$ is acquired. Accordingly, the $P_{set}$ operated in step S 41 not only increases by $P_{step}$ of one step, it becomes the value which corresponds to the increase in the output of the LD in the LD output monitoring value $PLD_{mon}$. By the time when n becomes N, the LD output monitoring value $PLD_{mon}$ becomes the value substantially equivalent to that of PLD, and therefore, $P_{set}=N \times P_{step}=Pf$ is established and in the N-th step, the optical output setting value Pf is achieved. In step S 57, the four modulation amplitudes of the X side I signal arm, the X side Q signal arm, the Y side I signal arm, and the Y side Q signal arm are added to the time division ABC control and the processing is completed.

FIGS. 19 and 20 explain the change in the optical output by the control of the configuration example of the present invention and the time division ABC control.

In FIGS. 19 and 20, as illustrated in FIGS. 14 and 15, the modulation amplitude is increased once the optical output becomes $P_{min}$ until it gradually becomes the prescribed value of PLD. Since the control performed in sections I to XII of the processes 2 and 3 as well as in the conventional ABC control are the same as those in FIGS. 14 and 15, their explanations are omitted.

In the configuration examples of the present invention, since the optical output of the optical transmitter is detected and controlled when the modulation amplitude is increased gradually, the setting value of the optical output (Pf setting value) is also gradually increased. This is illustrated in FIG. 19 (2).

FIG. 19 (1) corresponds to FIG. 14 (1), FIG. 19 (3) corresponds to FIG. 14 (2), and FIG. 19 (4) corresponds to FIG. 14 (3), respectively. As illustrated in FIG. 19 (1), the optical output of the LD is gradually increased from $P_{min}$ to PLD. As illustrated in FIG. 19 (2), the optical output of the phase modulator is increased in a step-by-step manner from 0 to Pf. In addition, as illustrated in FIG. 19 (3), the amplitude control signal (modulation amplitude) is also increased in a step-by-step manner from 0 to $2V\pi$.

FIG. 19 (3) schematically illustrates the amplitude control signal which increases linearly. As illustrated in steps S 46 and S 52 of FIG. 18B, in some cases, the setting amplitude decreases and so does the modulation amplitude. In practice, however, since the $P_{set}$ is set to have a larger value than the value at the time of previous control by considering $PLD_{mon}$ which is the LD output monitoring value, it is considered that there is almost no case where the modulation amplitude decreases. Accordingly, FIG. 19 (3) illustrates the case where the modulation amplitude linearly increases.

Although the modulation amplitude is made to linearly increase regardless of the increase in the LD optical output in the processing of FIG. 13, the modulation amplitude is made to increase gradually, detecting the optical output of the output side of the phase modulator and controlling the value of the optical output of the output side of the phase modulator by the effect of both the increase in the optical output of the LD and the increase in the modulation amplitude in the processing of FIGS. 17 to 18B.

Figure 21:
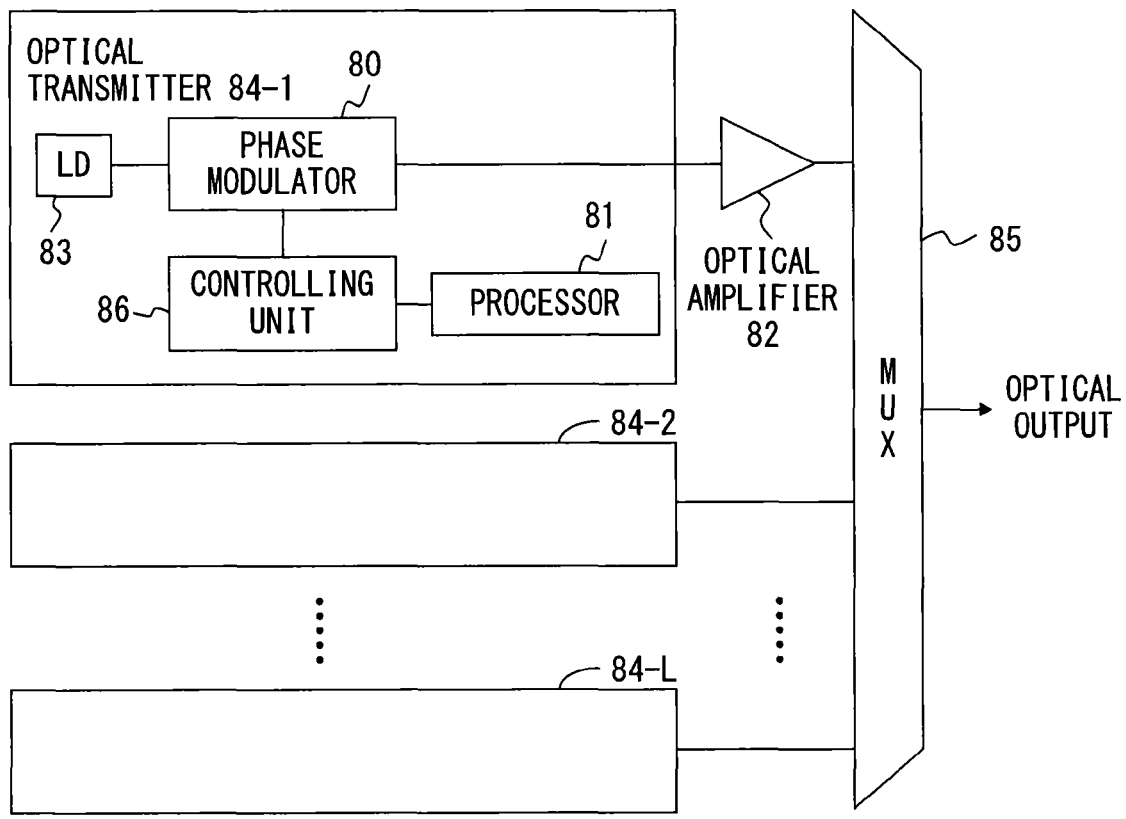
FIG. 21 is a block configuration diagram of the optical transmitter.

FIG. 21 is a block diagram of the optical transmission device.

The optical transmission device includes the optical transmitters 84-1 to 84-L which generate the optical signals with different wavelengths and transmits the optical signals by multiplexing these optical signals with a wavelength multiplexer (MUX) 85. The optical transmitters 84-1 to 84-L include the phase modulator 30, the controlling unit 86 which performs the control stated in the present embodiment, the processor 81, and the LD 83 which is the optical source. In addition, the optical signal from the optical transmitter 84 is amplified by the optical amplifier 82 and is input to the MUX 85.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An optical transmitter including a phase modulator, the optical transmitter comprising:
   a controlling unit which controls a bias voltage of a driving signal which drives the phase modulator and a modulation amplitude of the driving signal; and
   a processor which controls, after a startup of the optical transmitter, the controlling unit to vary an operational point of the bias voltage to decrease an optical output of light transmission characteristics of the phase modulator with keeping a setting of an amplitude value of the modulation amplitude to zero and which controls, after the optical output becomes the smallest, the controlling unit to increase the modulation amplitude from zero where the optical output becomes a target value with keeping the operational point of the bias voltage at which the optical output becomes the smallest.

2. The optical transmitter according to claim 1, further comprising:
   a memory which stores the target value and a step number; and
   a timer which measures a unit time of a step; wherein the processor controls the controlling unit so as to increase the modulation amplitude to the target value in a step-by-step manner taking a predetermined time period.

3. The optical transmitter according to claim 1, further comprising:
   a monitoring unit which monitors optical output of the optical transmitter, wherein the processor controls the monitored optical output to the modulation amplitude to be the target value, as well as controls the controlling unit so as to increase the target value to be a prescribed value.

4. The optical transmitter according to claim 3, further comprising:
   a memory which stores the prescribed value and the step number; and a timer which measures a unit time of a step; wherein the processor changes the modulation amplitude in a step-by-step manner taking a predetermined time period.

5. The optical transmitter according to claim 1, wherein
the phase modulator consists of a plurality of stages,
the control of varying the operational point of the bias voltage is performed by controlling each of the plurality of the stages by time division, and
the control of increasing the modulation amplitude is also performed by controlling each of the plurality of the stages by time division.

6. A controlling method of an optical transmitter comprising a phase modulator, the controlling method comprising:
after the startup of the optical transmitter, varying an operational point of a bias voltage of a driving signal, which drives the phase modulator to decrease an optical output of light transmission characteristics of the phase modulator with keeping a setting of an amplitude value of a modulation amplitude of the phase modulator to zero; and
after the optical output becomes the smallest, increasing the modulation amplitude from zero where the optical output becomes a target value with keeping the operational point of the bias voltage at which the optical output becomes smallest.

7. An optical transmitter including a phase modulator, the optical transmitter comprising:
a controlling unit which controls a bias voltage of a driving signal which drives the phase modulator and a modulation amplitude of the driving signal; and
a processor which controls, after a startup of the optical transmitter, the controlling unit to vary an operational point of the bias voltage to decrease an optical output of light transmission characteristics of the phase modulator with keeping a setting of an amplitude value of the modulation amplitude to a minimum value and which controls, after the optical output becomes the smallest, the controlling unit to increase the modulation amplitude from the minimum value where the optical output becomes a target value with keeping the operational point of the bias voltage at which the optical output becomes the smallest.

8. A controlling method of an optical transmitter comprising a phase modulator, the controlling method comprising:
after the startup of the optical transmitter, varying an operational point of a bias voltage of a driving signal, which drives the phase modulator to decrease an optical output of light transmission characteristics of the phase modulator with keeping a setting of an amplitude value of a modulation amplitude of the phase modulator to a minimum value; and
after the optical output becomes the smallest, increasing the modulation amplitude from the minimum value where the optical output becomes a target value with keeping the operational point of the bias voltage at which the optical output becomes smallest.

* * * * *

UNITED STATES PATENT AND TRADEMARK OFFICE
CERTIFICATE OF CORRECTION

| | |
|---|---|
| PATENT NO. | : 9,020,363 B2 |
| APPLICATION NO. | : 13/661606 |
| DATED | : April 28, 2015 |
| INVENTOR(S) | : Shuichi Yasuda |

It is certified that error appears in the above-identified patent and that said Letters Patent is hereby corrected as shown below:

On the Title Page

Column 1, Item [30] Foreign Application Priority Data, Line 1, insert -- December 13, 2011 (JP).....................2011-272835 --

Signed and Sealed this
Eighth Day of September, 2015

Michelle K. Lee
*Director of the United States Patent and Trademark Office*